(12) United States Patent
Nishikawa et al.

(10) Patent No.: US 9,068,504 B2
(45) Date of Patent: Jun. 30, 2015

(54) ENGINE OPERATED MACHINE

(75) Inventors: Tomomasa Nishikawa, Hitachinaka (JP); Fumikazu Hirasawa, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 52 days.

(21) Appl. No.: 13/976,240

(22) PCT Filed: Dec. 27, 2011

(86) PCT No.: PCT/JP2011/007286
§ 371 (c)(1),
(2), (4) Date: Jun. 26, 2013

(87) PCT Pub. No.: WO2012/090480
PCT Pub. Date: Jul. 5, 2012

(65) Prior Publication Data
US 2013/0291810 A1      Nov. 7, 2013

(30) Foreign Application Priority Data

Dec. 27, 2010 (JP) ................................. 2010-290374
Dec. 14, 2011 (JP) ................................. 2011-273882

(51) Int. Cl.
*B01D 45/12*      (2006.01)
*B01D 50/00*      (2006.01)
*F01P 1/02*       (2006.01)
(Continued)

(52) U.S. Cl.
CPC .............. *F02B 63/02* (2013.01); *B23D 59/006* (2013.01)

(58) Field of Classification Search
CPC ............... F02B 63/02; F02B 2075/025; F02B 2075/027; F02B 29/02; F02M 35/1017; F02M 35/10013; F02M 35/10262; B27B 17/00; F01P 5/06

USPC ........ 123/198 E, 41.63, 41.65, 41.7; 55/345, 55/346, 385.1, 385.3
See application file for complete search history.

(56) References Cited

U.S. PATENT DOCUMENTS 4,209,069 A      6/1980   Smith
6,227,162 B1 *   5/2001   Dahlberg et al. ......... 123/198 E
(Continued)

FOREIGN PATENT DOCUMENTS

DE    102005062693 A1    7/2007
EP         1640092 A1    3/2006
(Continued)

OTHER PUBLICATIONS

International Search Report issued in PCT/JP2011/007286 dated Jun. 6, 2012.

*Primary Examiner* — Marguerite McMahon
*Assistant Examiner* — Tea Holbrook
(74) *Attorney, Agent, or Firm* — McDermott Will & Emery LLP

(57) ABSTRACT

An engine-operated device includes a dust separating device. An air inlet provided on a first end side of the dust separating device. A first discharge opening is provided in the lateral surface on a second end side of the longitudinal direction, and a second discharge opening is provided to be separated from the first discharge opening. A first connecting passage is connected between the first discharge opening and the rotor cover of a magneto-rotor, and a second connecting passage is connected between an upstream side of an air cleaner case and the second discharge opening.

14 Claims, 24 Drawing Sheets

(51) Int. Cl.
  *F02M 35/02* (2006.01)
  *F02B 63/02* (2006.01)
  *B23D 59/00* (2006.01)

(56) References Cited

U.S. PATENT DOCUMENTS 6,681,726 B2 * 1/2004 Linsbauer et al. ......... 123/41.65
6,991,664 B2 * 1/2006 Riehmann et al. ............. 55/321
2001/0003983 A1   6/2001 Iida et al.
2004/0055470 A1 * 3/2004 Strauser et al. ................. 96/417
2009/0293836 A1 * 12/2009 Schindler et al. ......... 123/198 E

FOREIGN PATENT DOCUMENTS

| EP | 1679156 A1 | 7/2006 |
| JP | 2006-194152 A | 7/2006 |
| WO | WO-03/051574 A1 | 6/2003 |
| WO | WO-2010/038652 A1 | 4/2010 |

* cited by examiner

Cylindrical Part | Projecting Part

ENGINE OPERATED MACHINE

RELATED APPLICATIONS

This application is the U.S. National Phase under 35 U.S.C. §371 of International Application No. PCT/JP2011/007286, filed on Dec. 27, 2011, which in turn claims the benefit of Japanese Application Nos. 2010-290374, filed on Dec. 27, 2010 and 2011-273882, filed Dec. 14, 2011, the disclosures of which Applications are incorporated by reference herein.

TECHNICAL FIELD

The present invention relates to an engine-operated machine, particularly to a portable engine-operated machine such as a cutoff saw or a chain saw.

BACKGROUND ART

Upon operation with an engine-operated machine such as a cutoff saw or an engine cutter for performing an operation of cutting, for example, concrete, a large amount of fine particles of, for example, concrete powder is scattered around the engine-operated machine. If the scattered fine particles adhere to an air filter, the air filter undergoes clogging, and the performance of the engine is reduced. Therefore, the air filter has to be frequently replaced or cleaned, which is a large burden to the operator. Therefore, in Patent Literature 1, a funnel-shaped passage is provided in the upstream of the air filter, and dust is caused to fall by gravity, thereby sending the air with a small amount of dust to the air filter.

CITATION LIST

Patent Literature

PTL 1: Japanese Patent Application Laid-Open Publication No. 2006-194152

SUMMARY OF INVENTION

Technical Problem

Incidentally, in the technique of Patent Literature 1, dust is caused to fall and be separated by gravity. Therefore, the engine-operated machine of which direction is changed in accordance with the operation has a problem that the direction of the gravity and the direction in which dust falls do not always match depending on the state of the operation, and it is difficult to always send the air with a small amount of dust to the air filter.

The present invention has been made in view of the above-described problem. A preferred aim of the present invention is to provide an engine-operated machine capable of always sending the air with a small amount of dust to an air filter.

Another preferred aim of the present invention is to provide an engine-operated machine with which operation can be stably carried out even in poor conditions in which a large amount of dust is generated by introducing only the air in which the amount of dust is considerably reduced to the air filter.

Still another preferred aim of the present invention is to provide an engine-operated machine which facilitates cleaning or replacement of an air cleaning material of an air cleaner case and extends a life of the air cleaning material.

Solution to Problem

To achieve the above-described preferred aims, an engine-operated machine according to the present invention includes suction means being driven by an engine to suction air; an air cleaner case housing an air filter filtrating the air supplied to the engine; a dust separating device having a substantially tubular shape, the dust separating device having an air inlet provided to a lateral surface on a first end side in a longitudinal direction so as to be inclined in a predetermined direction with respect to a radial direction in a longitudinal-direction view and to penetrate through inside and outside of the lateral surface, a first discharge opening provided to the lateral surface on a second end side in the longitudinal direction, and a second discharge opening provided to the second end so as to be separated from the lateral surface on the second end side; a first air discharge passage having a first end connected to the suction means and having a second end connected to the first discharge opening; and a second air discharge passage having a first end connected to the air cleaner case in the upstream side of the air filter and having a second end connected to the second discharge opening. A plurality of the air inlets may be provided. A center of the second discharge opening may be positioned in a vicinity of a center of the substantially tubular shape in the longitudinal-direction view. The dust separating device may have a boundary wall in a tubular shape separated from the lateral surface so as to surround an outer edge of the second discharge opening at the second end and extending toward a direction to the first end so as to be opposed to the first discharge opening. A cross-sectional area of the dust separating device in the longitudinal direction between the air inlet and the first discharge opening may be gradually increased from the air inlet side toward the first discharge opening side. The suction means may be a cooling fan attached to a crank shaft of the engine for cooling the engine.

According to another characteristic of the present invention, the engine-operated machine includes: a cooling fan attached to an output shaft of an engine driving a bit tool and generating cooling air of a cylinder; an air cleaner case housing an air filter filtrating the air suctioned to the cylinder of the engine; and a dust separating device in a substantially cylindrical shape having a suction part performing suction while rotating the air by an air inlet inclined in a circumferential direction, a main body part moving garbage or dust molecules mixed in the air to an outer peripheral side by centrifugal force by swirling the introduced air at a high speed in a container in a cone shape, a first discharge part discharging the air in a center part at an end of the main body part, and a second discharge part discharging the air in a peripheral part, the first discharge part being connected to the air cleaner case and the second discharge part being connected to the suction part of the cooling fan. The longitudinal direction of a tube of the dust separating device is substantially parallel to a crank shaft of the engine-operated machine. The dust separating device is preferable to be attached to the engine so that the discharge part is disposed on the same side as the cooling fan when viewed from a center of the engine. The suction part is preferable to be on the opposite side of the cooling fan when viewed from the center of the engine. The air suctioned via the first discharge opening is filtrated by a sponge and/or a paper filter provided in the air cleaner case and sent to the cylinder. The air having a high dust rate in the dust separating device is suctioned from the second discharge part by work of the cooling fan, and the air having a low dust rate in the dust separating device is sent to the air cleaner case by air-intake work of the engine.

According to still another characteristic of the present invention, a center line in the longitudinal-direction of the dust separating device is positioned on a front side than a perpendicular plane passing through the crank shaft of the engine is. The engine-operated machine is, for example, a cutter having a rotary cutting blade as the bit tool, and a center line in the longitudinal direction of the tube of the dust separating device is disposed so as to be positioned between the perpendicular plane passing through the crank shaft of the engine and a rear end of a wheel guard covering the cutting blade when viewed in a front-back direction of the engine-operated machine. The cylinder is disposed so as to be extended in a substantially perpendicular direction, a muffler of the engine is provided in a front lower side of the cylinder, a carburetor of the engine is provided on a rear side of the cylinder, the air cleaner case is disposed so as to be extended to an upper side of the cylinder and the carburetor in a top view, and the dust separating device is disposed so as to be adjacent to a front of the air cleaner case.

Advantageous Effects of Invention

According to the present invention, the engine-operated machine includes: a dust separating device having a substantially cylindrical shape having both ends closed, the dust separating device having an air inlet provided in a lateral surface on a first end side of a longitudinal direction so as to be inclined in a predetermined direction with respect to a radial direction in a longitudinal-direction view and to penetrate through inside and outside of the lateral surface, a first discharge opening provided in the lateral surface on a second end side of the longitudinal direction, and a second discharge opening provided at the second end to be separated from the lateral surface on the second end side; a first air discharge passage having a first end connected to the suction means and having a second end connected to the first discharge opening; and a second air discharge passage having a first end connected to the air cleaner case in the upstream side of the air cleaner and having a second end connected to the second discharge opening. Therefore, the engine-operated machine capable of introducing the air containing a small amount of the dust inside the swirling flows from the second discharge opening to the air cleaner case by generating swirling flows in the dust separating device and always sending the air containing a small amount of the dust to the air filter without being affected by a state of operation can be provided.

According to another invention of the present invention, the first discharge part of the substantially-cylindrical dust separating device is connected to the air cleaner case, the second discharge part is connected to the suction part of the cooling fan, and the longitudinal direction of the tube of the dust separating device is substantially parallel to the crank shaft of the engine-operated machine. Therefore, the dust separating device can be effectively disposed utilizing dead space, and an increase in the size of the product thereof can be prevented. Moreover, in this case, the discharge part is disposed on the same side as the cooling fan when viewed from the center of the engine, and the dust separating device is attached to the engine so that the suction part is on the opposite side of the cooling fan when viewed from the center of the engine. Therefore, the dust separating device can be connected to the suction part of the cooling fan with a short distance therebetween. Furthermore, filter means such as a sponge and/or a paper filter is housed in the air cleaner case, and the air suctioned via the first discharge opening is further filtrated by the filter means. Therefore, reliability and durability of the engine can be considerably improved.

Above described and other objects and novel characteristics of the present invention will be apparent from the following descriptions of the present specification and the accompanied drawings.

EXAMPLE 1

Figure 1:
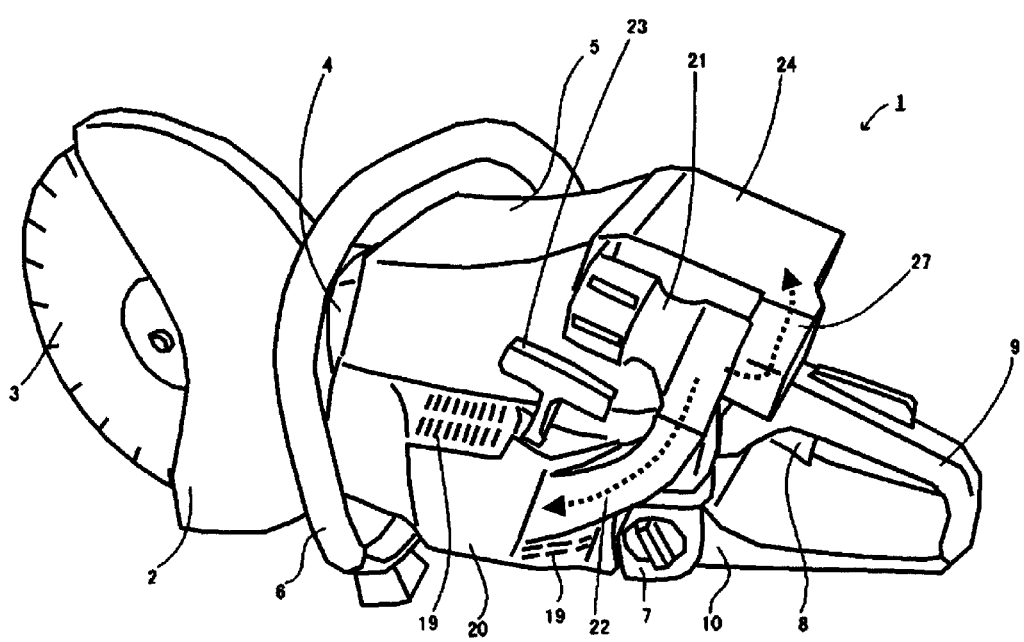
FIG. 1 is a perspective view of an engine cutter according to the present invention.

Hereinafter, Example of the present invention will be explained along the accompanied drawings FIGS. 1 to 13. As shown in FIG. 1, an engine cutter (cutoff saw, engine-operated machine) 1 is provided with: a blade 3 partly covered with a blade cover 2; a casing 5 housing a two-stroke engine (hereinafter, "engine", not illustrated), which drives the blade 3, a muffler 4, and a carburetor (not illustrated); a front handle 6 held by an operator; a fuel tank 7; and a rear handle 9 provided with a trigger 8, which adjusts the output of the engine.

Figure 2:
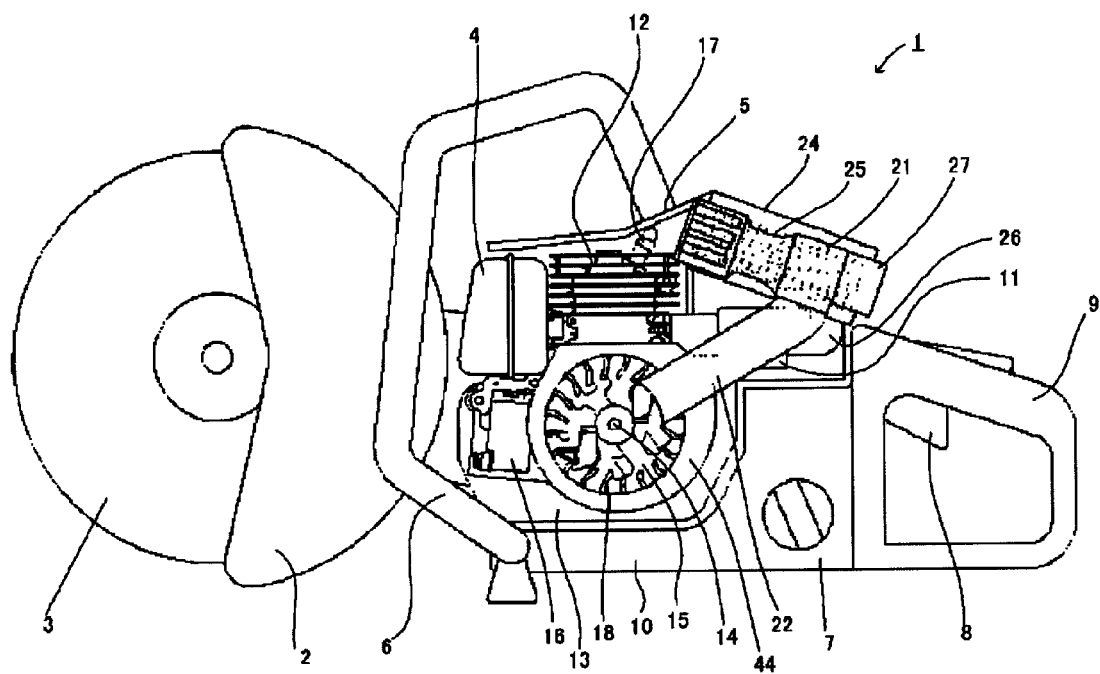
FIG. 2 is a lateral view in which part of the engine cutter of FIG. 1 is shown by cross section.

As shown in FIG. 2, an engine 12 connected to the muffler 4 and a carburetor 11 are housed in the casing 5. A magneto-rotor 15, which is integrally rotated with a crank shaft 14, is attached to the crank shaft 14 projecting from a crank case 13 of the engine 12. An ignition coil 16 is provided at the crank case 13 of the engine 12 so as to be opposed to the magneto-rotor 15 with space therebetween. The ignition coil 16 is coupled to a spark plug 17 of the engine 12 by a plug code (not illustrated) and generates an ignition spark at the spark plug 17. The magneto-rotor 15 is provided with a plurality of wings 18 for sending cooling winds to the engine 12, and the magneto-rotor 15 constitutes a cooling fan (suction means). As shown in FIGS. 1 and 2, the magneto-rotor 15 is covered with a rotor cover 20, which is provided with a plurality of air-intake openings 19, and a fan cover 44, which is positioned inside the rotor cover 20, has an intake opening 45 formed at the center thereof, and has a wall surface opposed to an outer peripheral side of the wings 18. A first connecting passage (first air discharging passage) 22 extending from a dust separating device 21 is connected to the inside of the intake opening 45 of the fan cover 44. A starter handle 23 for starting the engine 12 is disposed outside the rotor cover 20. Furthermore, an air cleaner case 24 is provided between the engine 12 and the rear handle 9. An air filter 25 is provided inside the air cleaner case 24, and the air filter 25 filters the air supplied from the air cleaner case 24 to the carburetor 11 through an air-intake passage 26. A second connecting passage (second air discharging passage) 27 extending from the dust separating device 21 is connected to the air cleaner case 24.

Figure 3:
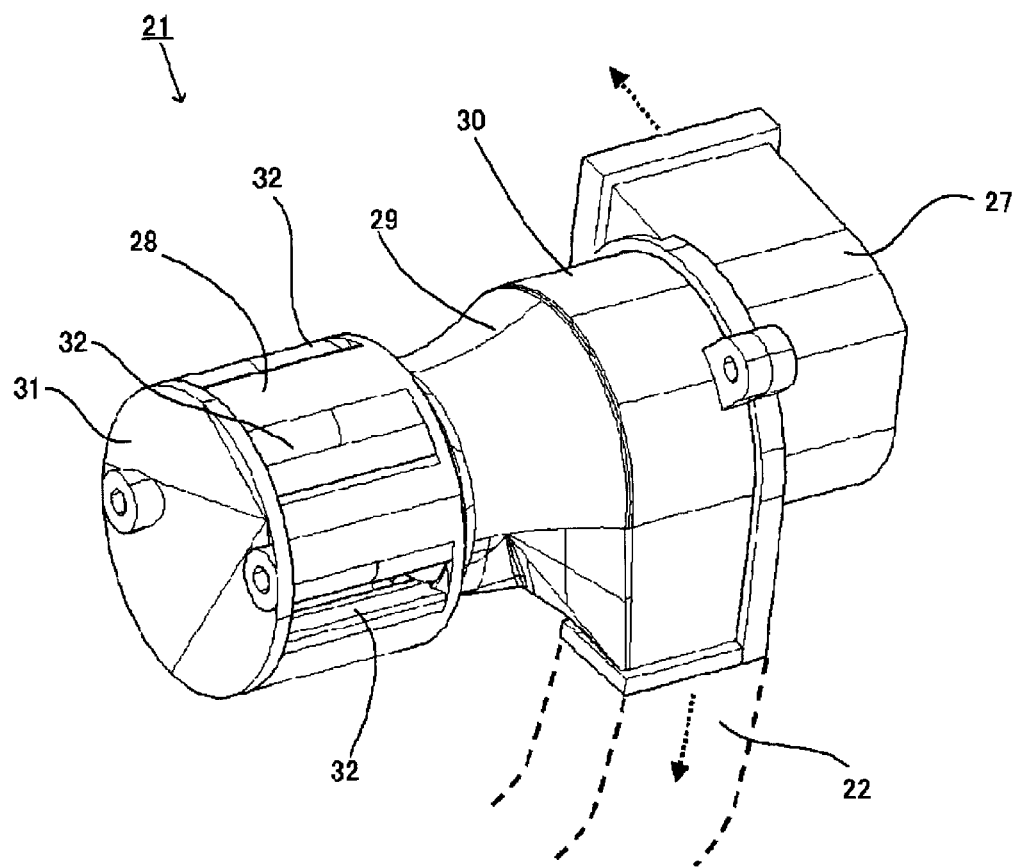
FIG. 3 is an enlarged perspective view of a dust separating device part of the engine cutter of FIG. 1.
Figure 4:
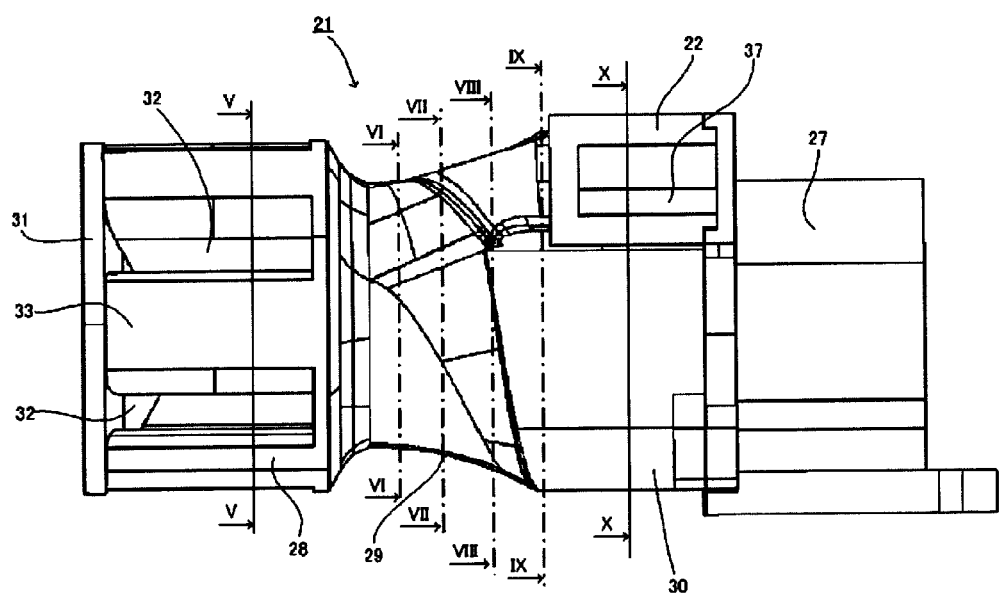
FIG. 4 is a lateral view of FIG. 3.

As shown in FIGS. 3 and 4, the dust separating device 21 has a shape of substantially multi-level cylinder composed of a suction part 28 having a substantially cylindrical shape, a coupling part 29 having a shape of a substantially circular truncated cone, and a separation part 30 having a substantially cylindrical shape. The separation part 30 is communicated with the inside of the fan cover 44 (see FIG. 2) through the first connecting passage 22 connected to a first discharge opening (not illustrated) provided in a lateral surface of the separation part 30 and is also communicated with the air cleaner case 24 (see FIGS. 1 and 2) through the second connecting passage 27 connected to a second discharge opening (not illustrated) provided in a bottom surface (an end on a side that is away from the coupling part 29) of the separation part 30. The end of the suction part 28 that is away from the coupling part 29 is closed by a cover part 31, and a plurality of air inlets 32 are formed in the lateral surface of the suction part 28. The coupling part 29 has the shape of substantially circular truncated cone of which an outer diameter is gradually increased from the suction part 28 toward the separation part 30.

Figure 5:
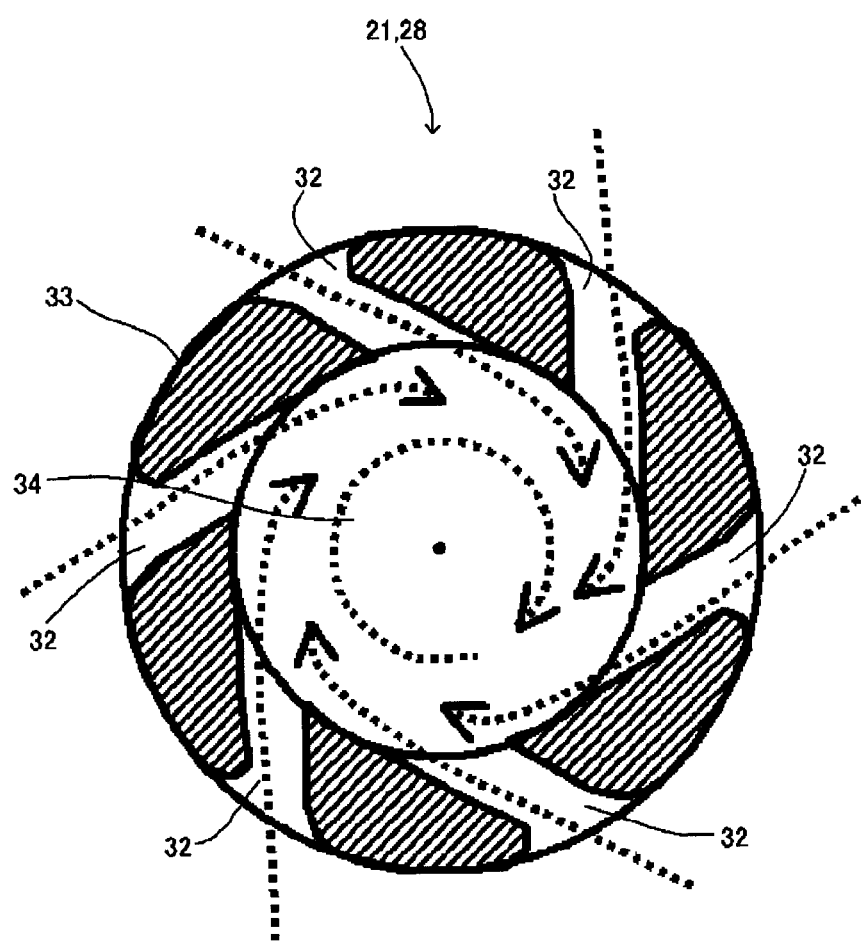
FIG. 5 is a cross-sectional view cut along the V-V line of FIG. 4.
Figure 6:
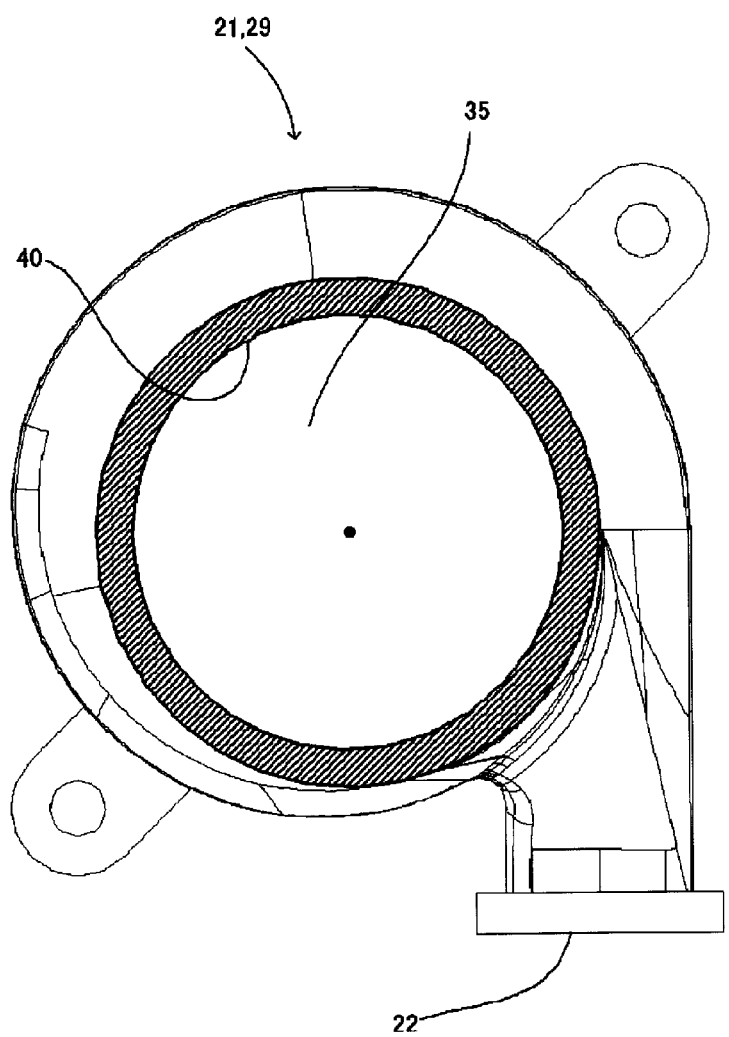
FIG. 6 is a cross-sectional view cut along the VI-VI line of FIG. 4.
Figure 7:
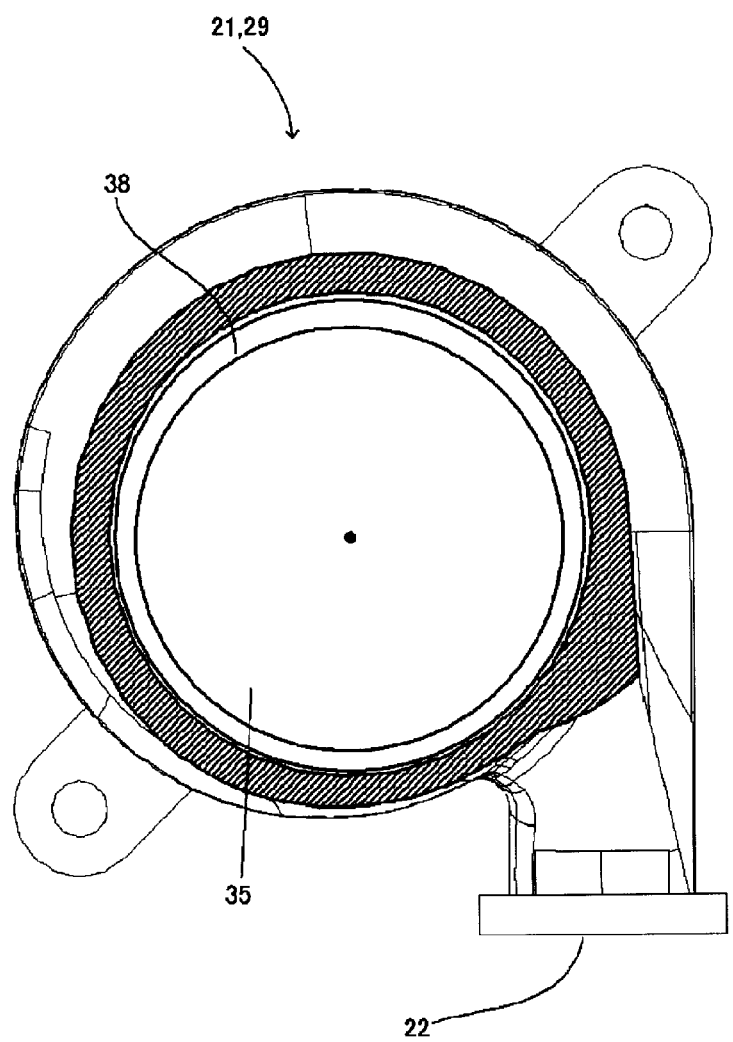
FIG. 7 is a cross-sectional view cut along the VII-VII line of FIG. 4.
Figure 8:
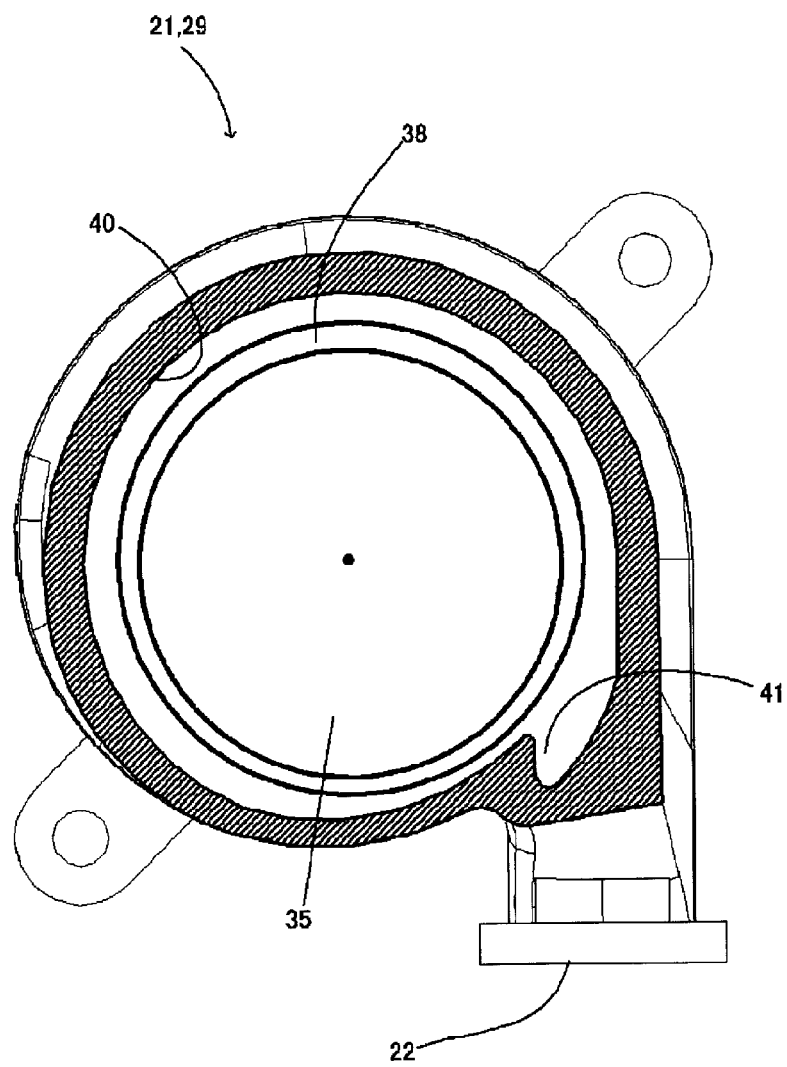
FIG. 8 is a cross-sectional view cut along the VIII-VIII line of FIG. 4.
Figure 9:
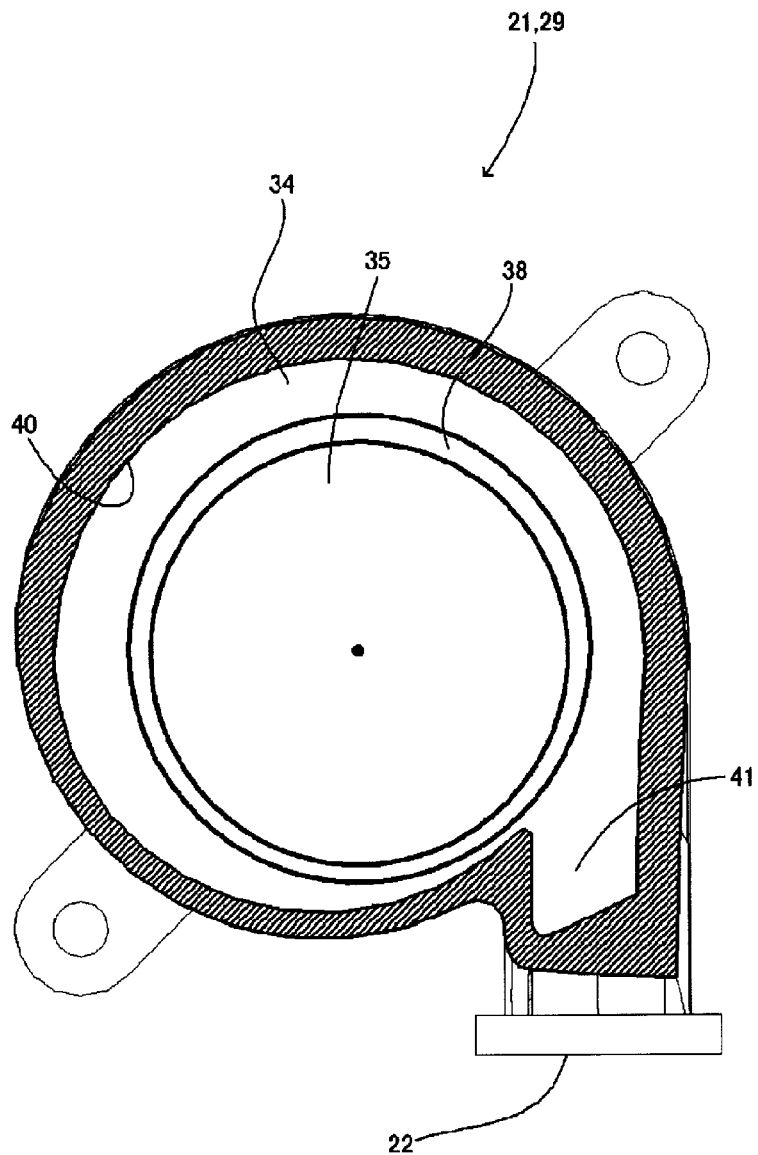
FIG. 9 is a cross-sectional view cut along the IX-IX line of FIG. 4.
Figure 10:
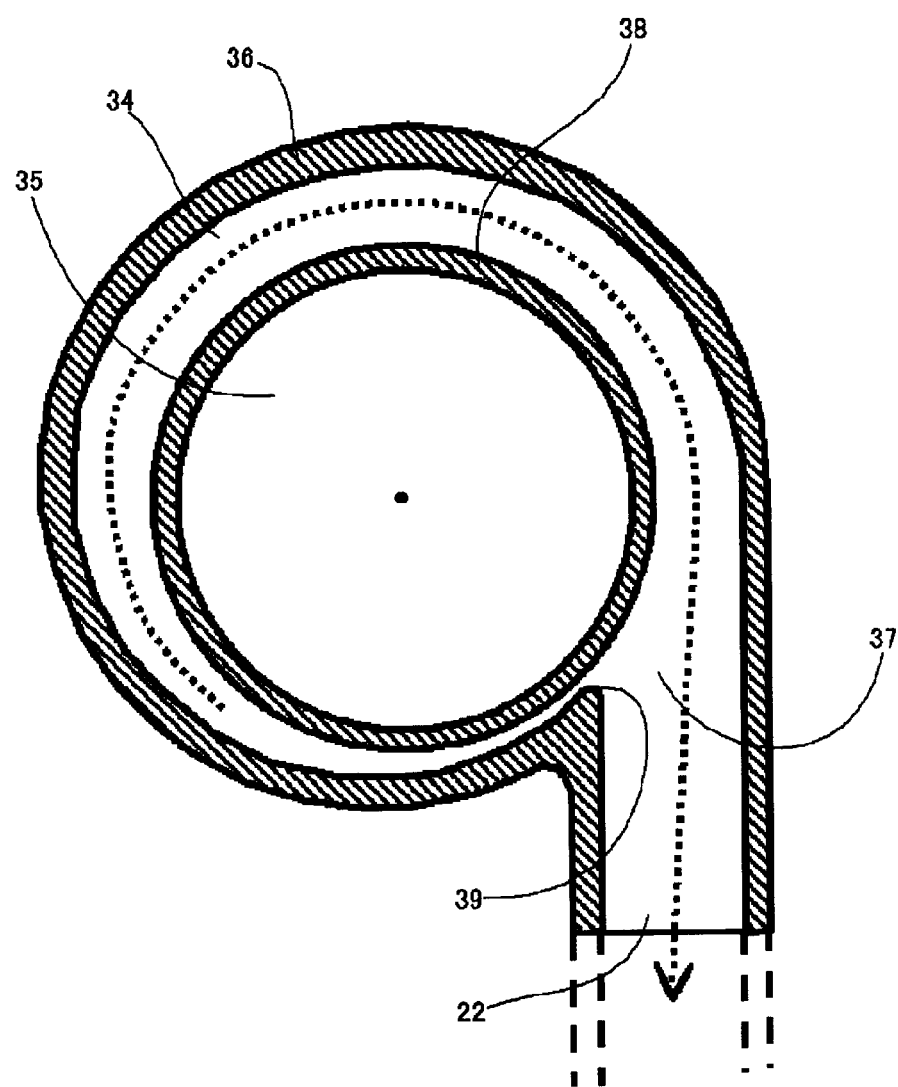
FIG. 10 is a cross-sectional view cut along the X-X line of FIG. 4.
Figure 11:
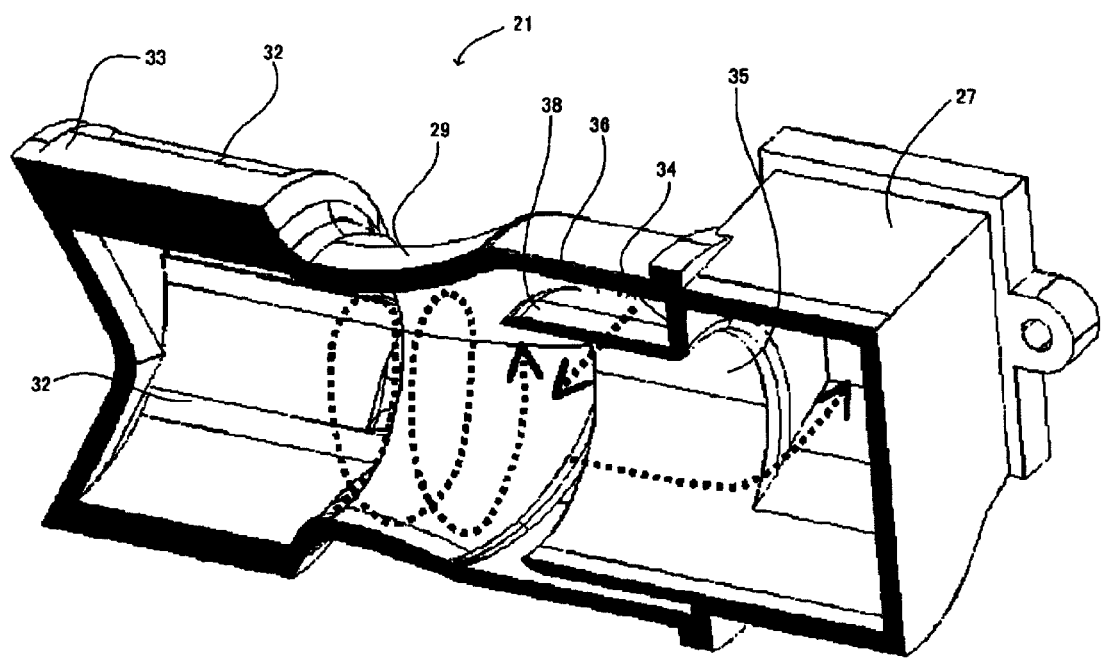
FIG. 11 is a cross-sectional view of FIG. 3.

As shown in FIG. 5, in a longitudinal-direction view of the dust separating device 21, each of the plurality of air inlets 32 provided in the lateral wall 33 of the suction part 28 in a cylindrical shape at a substantially equal interval in the circumferential direction penetrate therethrough so as to be directed substantially toward a direction of a tangent line with an inclination in a predetermined direction with respect to the radial direction. As shown in FIGS. 6 to 9 and 11, in longitudinal-direction views of the dust separating device 21, the cross-sectional area of the coupling part 29 is gradually increased from the suction part 28 toward the separation part 30. Furthermore, as shown in FIGS. 10 and 11, in the separation part 30, a bottom surface (the end on the side that is away from the coupling part 29) 34 is provided with a second discharge opening 35. Also in the separation part 30, a boundary wall 38 having a cylindrical shape extending from the bottom surface 34 toward the coupling part 29 is provided so as to surround an outer edge of the second discharge opening 35 and separated from the inside of an outer lateral wall 36 of the separation part 30. The boundary wall 38 is formed to have a length so that it is opposed to a first discharge opening 37, in other words, formed so that a position of an end of the boundary wall 38 that is on the coupling part 29 side and a position of an end of the first discharge opening 37 on the coupling part 29 side substantially match each other in the longitudinal direction of the dust separating device 21 or the position of the end on the boundary wall 38 side is closer to the coupling part 29 side. The boundary wall 38 in the cylindrical shape is eccentrically provided so as to be close to a first end 39 of the first discharge opening 37 with respect to the outer lateral wall 36 in the cylindrical shape of the separation part 30 in the longitudinal-direction view of the dust separating device 21. Therefore, a volute shape which has a diameter gradually increased along with the circumferential direction thereof and is smoothly connected to the first discharge opening 37 is formed. The first discharge opening 37 is connected to the first connecting passage 22, and the second discharge opening 35 is connected to the second connecting passage 27. As shown in FIGS. 8 and 9, the boundary wall 38 is eccentrically provided so as to be close to the first end 39 (see FIG. 10) of the first discharge opening 37 also with respect to an inner peripheral wall 40 of the coupling part 29 in the longitudinal-direction view of the dust separating device 21. In the longitudinal-direction view of the dust separating device 21, a recessed portion 41 having a cross-sectional area that is increased as it gets closer to the separation part 30 is formed at a part overlapped with the first discharge opening 37 of the inner peripheral wall 40 of the coupling part 29.

Figure 12:
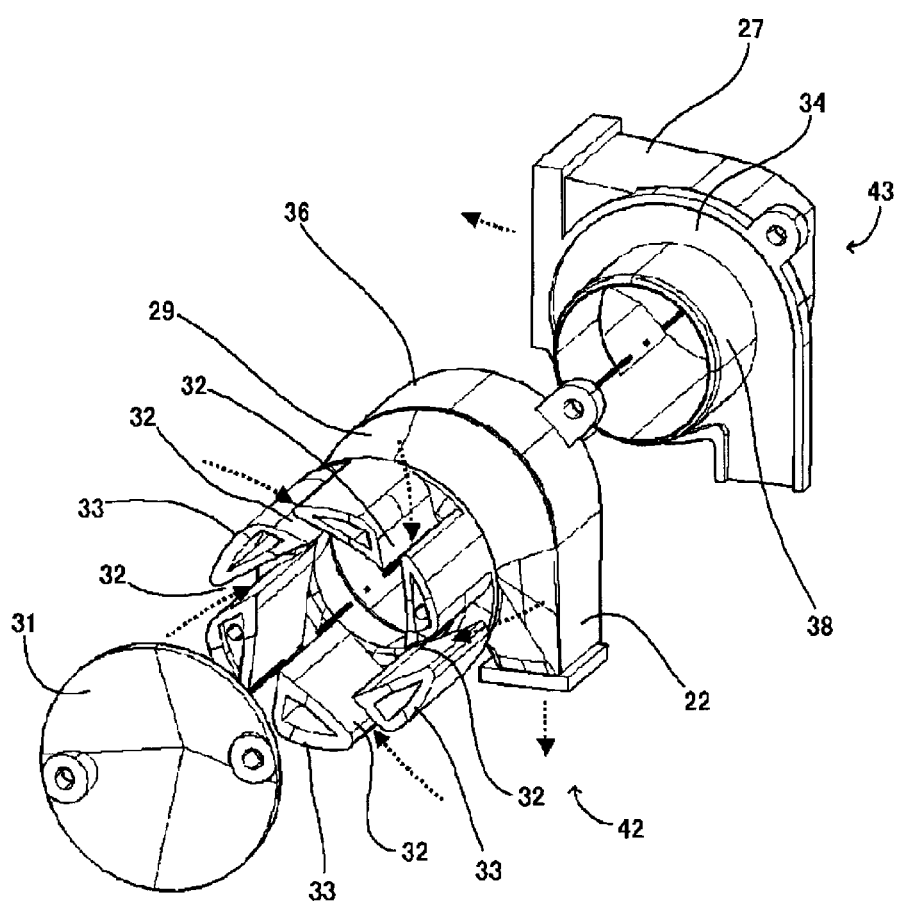
FIG. 12 is an exploded perspective view of FIG. 3.
Figure 13:
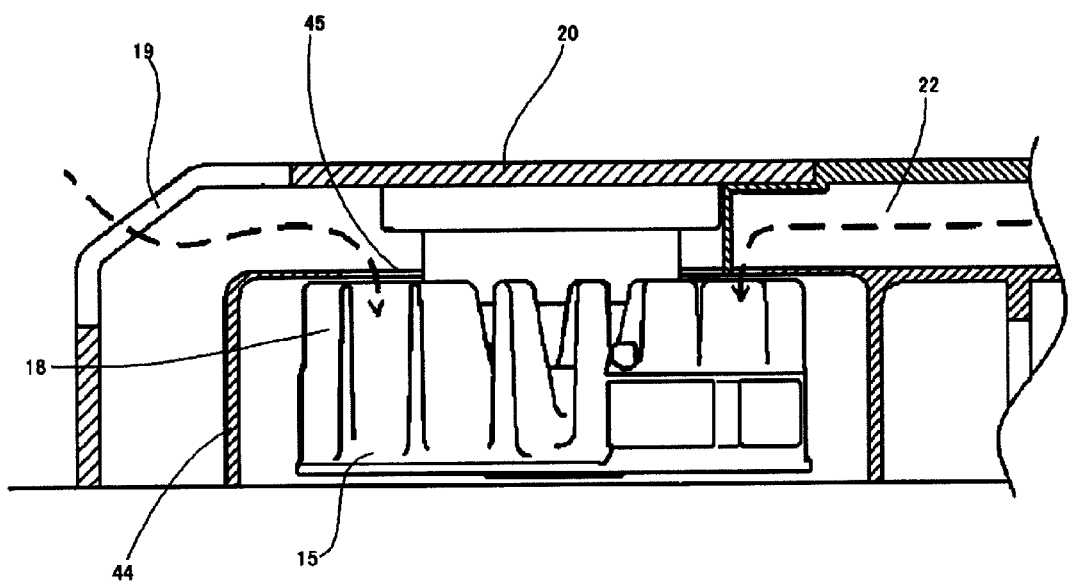
FIG. 13 is a cross-sectional view cut along a magneto-rotor part of FIG. 1

As shown in FIG. 12, the dust separating device 21 is composed of three parts, i.e.: the cover part 31 having an umbrella shape which is covering an end of the suction part 28 and projecting toward the coupling part 29 side; a main body part 42 composed of the lateral walls 33 and the air inlets 32 of the suction part 28, the coupling part 28, and the outer lateral wall 36 of the separation part 30; and a discharge part 43 composed of the bottom surface 34 of the separation part 30 and the boundary wall 38.

According to the thus-constituted engine cutter 1, when the engine 12 is started, the magneto-rotor 15 is rotated. Then, as shown with dotted lines in FIG. 13, air is suctioned from the air-intake holes 19 of the rotor cover 20 and the first connecting passage 22, which is connected to the separation part 30 of the dust separating device 21, by the wings 18 formed in the magneto-rotor 15, so that the air is blown toward the engine 12. As shown in FIGS. 5 and 12, in the dust separating device 21, the outside air is suctioned from the air inlets 32 of the separation part 30 by the suction force caused by the wings 18 of the magneto-rotor 15 and the negative pressure of a crank case caused along with elevation of a piston. Each of the plurality of air inlets 32 is provided in the lateral wall 33 of the suction part 28 in the cylindrical shape at the substantially equal interval in the circumferential direction so as to be directed substantially toward the direction of the tangent line with the inclination in a predetermined direction with respect to the radial direction. Therefore, as shown with dotted lines in FIG. 5, the outside air suctioned from the air inlets 32 becomes swirling flows in the suction part 28 and flows toward the coupling part 29. Then, as shown with dotted lines in FIG. 11, the swirling flows generated in the air-intake part 28 flow toward the separation part 30 while spreading in the radial direction and swirling in the coupling part 29. In this process, the dust contained in the outside air is separated to the outside of the radial direction, in other words, to the lateral wall side of the coupling part 29 because of the centrifugal force caused by the swirling flows. Therefore, the swirling flows are the swirling flows that contain a large amount of the dust in the outside of the radial direction and are the swirling flows that contain a small amount of the dust in the inside of the radial direction. Then, the outside air containing the dust flown into the separation part 30 while swirling is separated by the boundary wall 38 into the flow that contains a large amount of the dust on the outer lateral wall 33 side and the inside flow that contains a small amount of the dust. Then, the outside air that contains a large amount of the dust and flowing on the outer lateral wall 33 side is sent into the rotor cover 20 from the first discharge opening 37 through the first connecting passage 22 and cools the engine 12. On the other hand, the outside air that contains a small amount of the dust and flows inside is sent from the second discharge opening 35 to the air cleaner case 24 through the second connecting passage 27 and sent to the carburetor 11 through the air filter 25.

In this manner, the dust separating device 21 has the plurality of air inlets 32 each of which is inclined in the predetermined direction with respect to the radial direction at the substantially equal interval in the circumferential direction of the cylindrical suction part 28. Therefore, the swirling flows can be efficiently generated concentrically to the dust separating device 21 in the cylindrical dust separating device 21. The swirling flows are capable of sending the dust, which is in the outside air introduced from the air inlets 32, to the separation part 30 while keeping the dust to be close to the outer lateral wall in the radial-direction outside by the centrifugal force of the swirling flows. On the other hand, in the inner side of the swirling flows, the air from which the dust is removed can be sent to the separation part 30. Then, in the separation part 30, the air containing dust is discharged from the first discharge opening 37, which is provided in the outer lateral wall 36 of the separation part 30, to the first connecting passage 22, and the air passed through the first connecting passage 22 is suctioned by the wings 18 of the magneto-rotor 15 in the rotor cover 20 and blown to the engine 12 so as to be able to cool the engine 12. Moreover, in the separation part 30, the air from which the dust is removed is discharged from the second discharge opening 35, which is provided in the bottom surface 34 of the separation part 30, to the second connecting passage 27 and sent to the air cleaner case 24. Therefore, the air in which the amount of the dust has been reduced can be introduced to the air filter 25. Therefore, particularly under the environment in which a massive amount of dust is generated, for example, in an operation of cutting concrete, occurrence of clogging in the air filter 25 in an early stage can be considerably suppressed, reduction in the output of the engine 12 can be also eliminated, and the frequency of carrying out cleaning or replacement of the air filter, which has been frequently carried out, can be reduced to considerably improve maintainability. Moreover, in the separation part 30, the flows suctioned by the suction power of the wings 18 of the magneto-rotor 15 and containing dust on the outer peripheral side can be subjected to secondary use as cooling winds of the engine 12; therefore, heat generation of the engine 12 can be also suppressed without reducing the cooling wind. Furthermore, since the dust is separated by centrifugal separation, the dust can be separated without depending on the posture of the engine cutter 1 during operation. In the separation part 30, the boundary wall 38 in the cylindrical shape extending from the bottom surface 34 toward the coupling part 29 so as to be opposed to the first discharge opening 37 is provided to be separated from the inside of the outer lateral wall 36 of the separation part 30 so as to surround the outer edge of the second discharge opening 35. Therefore, the boundary wall 38 is capable of separating the inner flows of the swirling flows from which the dust flown into the separation part 30 is removed and the outer flows of the swirling flows containing the dust from each other and introducing the flows to the second discharge opening 35 and the first discharge opening 37, respectively. Therefore, the dust in the swirling flows can be more effectively separated by the boundary wall 38, clean air can be introduced by the air cleaner case 24, clogging of the air filter 25 in an early stage can be solved, and thus maintainability can be further improved. Moreover, as shown in FIG. 10, the boundary wall 38 is eccentric so as to be close to the first end 39 (see FIG. 10) of the first discharge opening 37; therefore, the channel for introducing the swirling flows to the first discharge opening 37, which is formed between the boundary wall 38 and the outer lateral wall 36 of the separation part 30, is gradually widened as the flow shown by a dotted line gets closer to the first discharge opening 37, enabling improvement of efficiency of the flow. Moreover, as shown in FIGS. 8 and 9, in the longitudinal-direction views of the dust separating device 21, the recessed portion 41 of which the cross sectional area is increased as it gets closer to the separation part 30 is formed in the part of the coupling part 29 that is overlapped with the first discharge opening 37 of the inner peripheral wall 40; therefore, the outer flows of the swirling flows flowing from the coupling part 29 into the separation part 30 can be efficiently guided to the part between the boundary wall 38 and the outer lateral wall 36.

Figure 14:
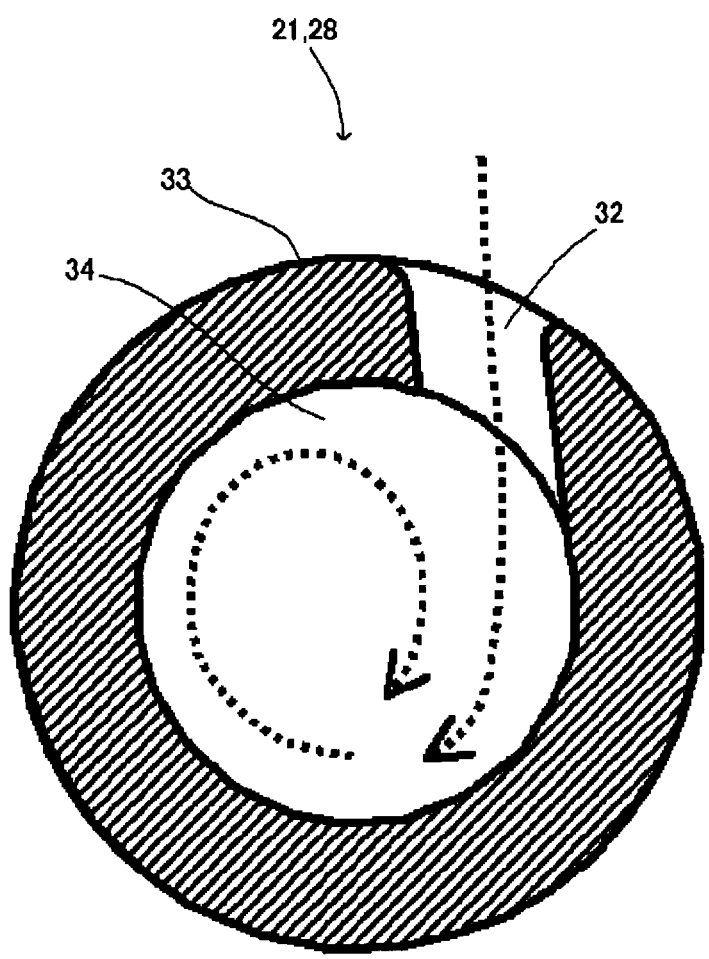
FIG. 14 is a diagram corresponding to FIG. 5 showing a modification example of the dust separating device.
Figure 15:
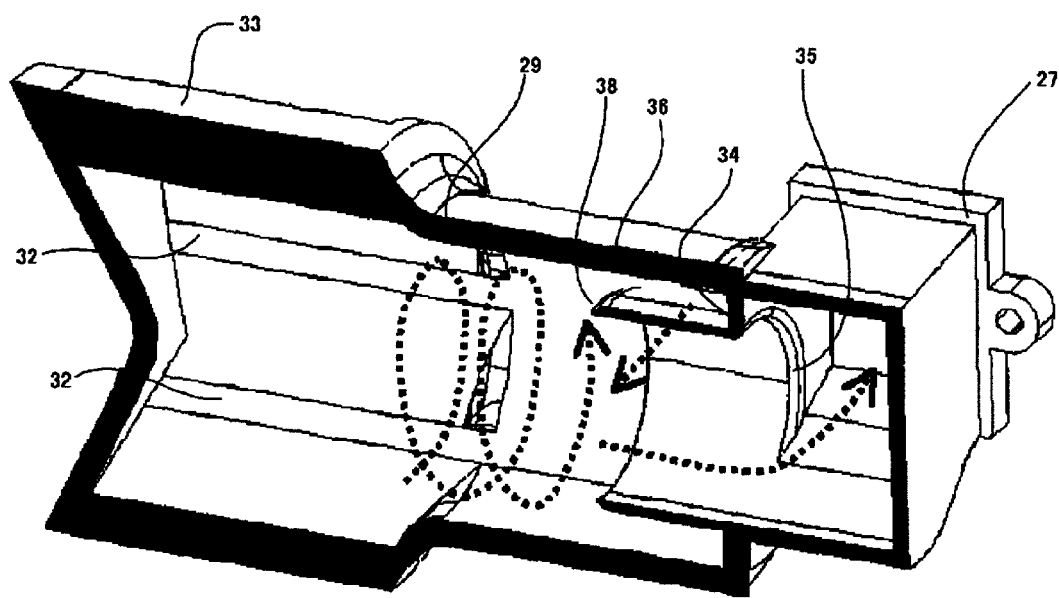
FIG. 15 is a diagram corresponding to FIG. 11 showing another modification example of the dust separating device.

In the above-described Example, the plurality of air inlets 32 are provided in the suction part 28 of the dust separating device 21 at the substantially equal interval in the circumferential direction; however, no limitation is imposed by this configuration. For example, the swirling flows may be generated in the dust separating device 21 by providing a plurality of air inlets 32 in the lateral surface of the suction part 28 at an optional interval or by providing a single air inlet 32 inclined in a predetermined direction with respect to the radial direction as shown in FIG. 14. The coupling part 29 of the dust separating device 21 is not limited to the configuration in which the cross-sectional area thereof is gradually increased from the suction part 28 toward the separation part 30; and, for example, as shown in FIG. 15, the coupling part 29 may have a cylindrical shape of which the cross-sectional area is not changed. Furthermore, the engine is not limited to the two-stroke engine, but may be a four-stroke engine. Application of the present invention is not limited to the engine cutter 1, and the present invention can be also applied to an engine-operated machine such as a chain saw or a hedge trimmer.

EXAMPLE 2

Figure 16:
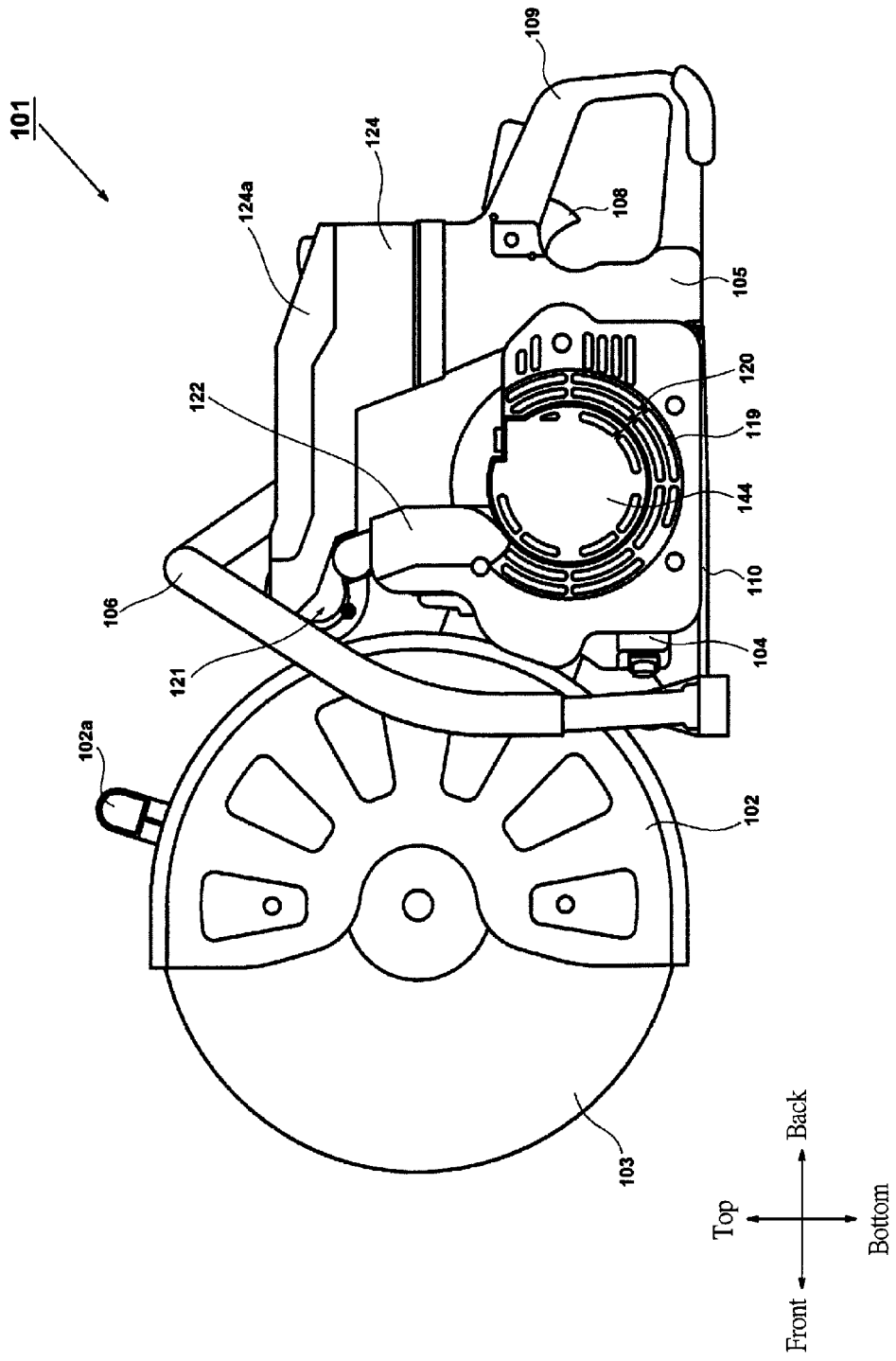
FIG. 16 is a left lateral view of an engine cutter according to Example 2 of the present invention.

Next, Example 2 of the present invention will be described with reference to FIGS. 16 to 26. FIG. 16 is a left lateral view of an engine-operated machine (engine cutter 101) according to Example 2. As shown in FIG. 16, the engine cutter (cutoff saw, engine-operated machine) 101 is provided with: a blade 103 partially covered with a blade cover 102; a two-stroke engine (hereinafter, "engine", not illustrated) which drives the blade 103; a muffler 104; a carburetor (not illustrated); a casing 105; a front handle 106 held by an operator; a fuel tank (not illustrated); a trigger 108 which adjusts the output of the engine; a rear handle 109; a frame part 110; and an arm 107 (described later) extending from the frame part 110 toward the front. The blade cover 102 is provided with an angle adjusting lever 102a for turning the blade cover 102 and adjusting the angle thereof. A crank shaft (not illustrated) of the engine which cannot be seen due to the casing 105 extends in the horizontal direction, and a magneto-rotor, which will be described later, is attached to the left end of the crank shaft. The part in which the magneto-rotor is positioned is covered with a rotor cover 120, which is provided with a plurality of air-intake openings 119, and a fan cover 144, which is positioned so as to cover an opening part of the rotor cover 120.

Figure 17:
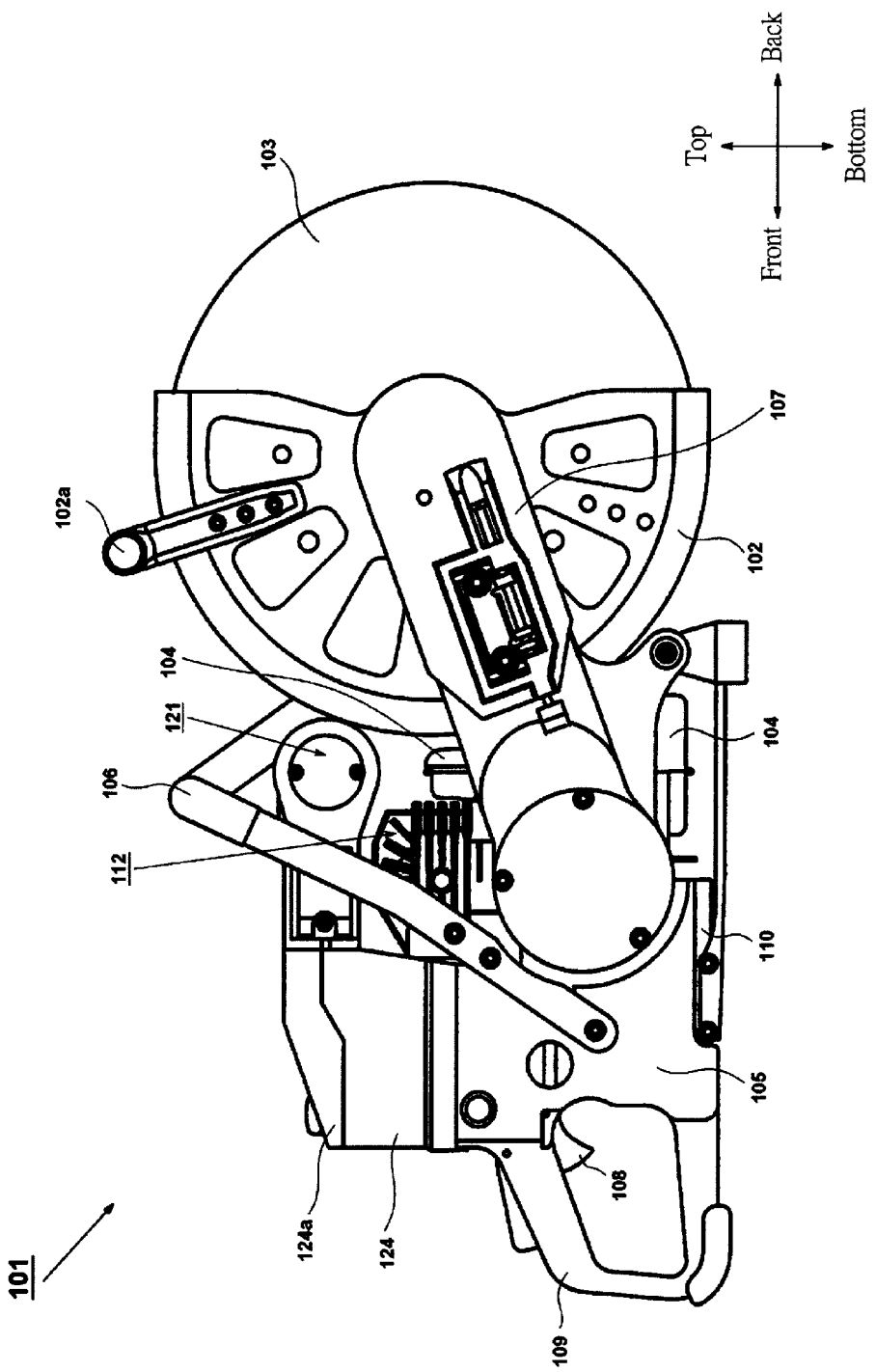
FIG. 17 is a right lateral view of the engine cutter according to Example 2 of the present invention.

FIG. 17 is a right lateral view of the engine cutter according to Example 2. The engine 112 is a two-stroke single-cylinder engine, in which an unshown piston moves in a vertical direction (perpendicular direction) in the cylinder, and an unshown output shaft (crank shaft) of the engine 112 is disposed so as to extend in the horizontal direction. An unshown centrifugal clutch is connected to an end of the output shaft, and an unshown belt extends from a drum of the centrifugal clutch through an arm 107 and rotates a spindle which is rotatably supported at a distal end of the arm 107 and holds the blade 103. The angle adjusting lever 102a plays the role as a handle which turns the blade cover 102. An air-cleaner-case casing 124 is provided from an upper side to a rear side of the engine 112 and above the casing 105, and an air-cleaner-case cover 124a is provided at an opening above the air-cleaner-case casing 124. A dust separating device 121 is provided in front of an air cleaner case defined by the air-cleaner-case case 124 and the air-cleaner-case cover 124a.

The basic configuration of the dust separating device 121 is substantially the same as that of the dust separating device 21 of Example 1, and it is provided on an upstream side of an air cleaner part, the outside air taken thereinto is subjected to primary purification of dust, etc. through the dust separating device 121, and only the clean air that has undergone separation is introduced the air cleaner part. In the air cleaner part, dust is subjected to filtration (secondary purification) by using an air filter in the same manner as existing widely used engines; therefore, effective purification can be carried out by the multi-stage configuration. When viewed in the front-back direction, the dust separating device 121 is disposed between the blade 103 and the engine 112. In Example 2, in the space between the blade 103 and the engine 112, the muffler 104 is disposed from a vicinity of the center to a vicinity of a lower side, and the dust separating device 121 is disposed in a space that is between the blade cover 102 thereabove and the cylinder and below the front handle 106.

Figure 18:
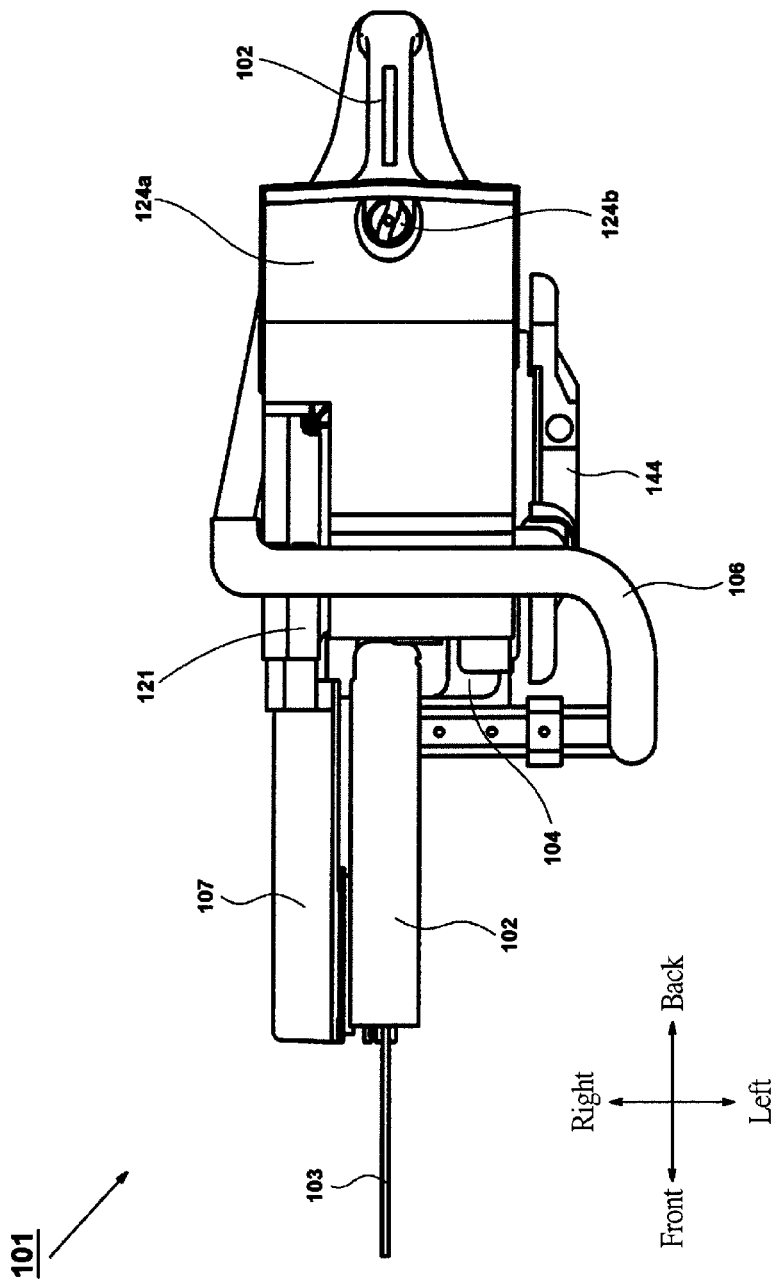
FIG. 18 is a top view of the engine cutter according to Example 2 of the present invention.

FIG. 18 is a top view of the engine cutter 101 according to Example 2 of the present invention. As is understood from FIG. 18, the dust separating device 121 is disposed so as to occupy a width that is substantially equal to that of the air-cleaner-case case 124 and the air-cleaner-case cover 124a. The dust separating device 121 is disposed above the muffler 104. The part that is surrounded by the air cleaner case, the front handle 106, and a vicinity of a rear end of the blade cover 102 and serving as an axial direction of a cylindrical shape of the dust separating device 121 is disposed so as to be in a horizontal direction, in other words, the axial direction is disposed in a direction that is parallel to the crank shaft of the engine 112.

Figure 19:
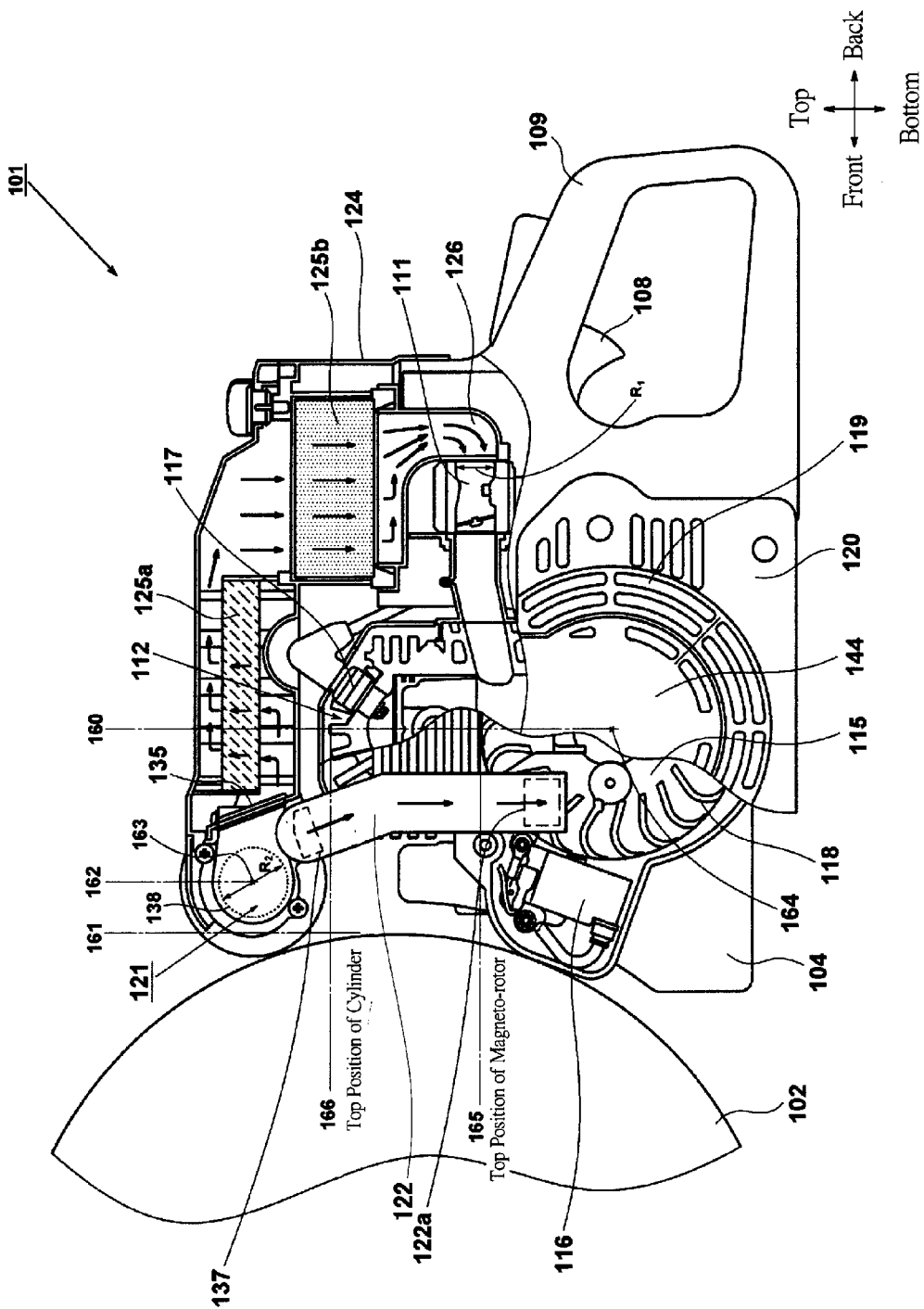
FIG. 19 is a partial enlarged cross-sectional view cut along the engine cutter according to Example 2 of the present invention.

FIG. 19 is a partially enlarged cross-sectional view cut along the engine cutter 101 according to Example 2 of the present invention. In FIG. 19, illustration of the front handle 106 is omitted. In FIG. 19, the flows of air separated into two and discharged from the dust separating device 121 are shown by arrows. The magneto-rotor 115, which rotates integrally with the crank shaft, is attached to the crank shaft of the engine 112. In the circumferential direction of the magneto-rotor 115, an ignition coil 116 is provided so as to be separated from and opposed to the magneto-rotor 115. The ignition coil 116 is coupled to a spark plug 117 of the engine 112 by a plug code. The magneto-rotor 115 is provided with a plurality of wings 118 for sending a cooling wind to a cooling fin formed at the cylinder of the engine 112, and the magneto-rotor 115 constitutes a cooling fan (suction means). The magneto-rotor 115 is covered with the rotor cover 120, which is provided with the plurality of air-intake holes 119, and the fan cover 144.

The dust separating device 121 has a first discharge opening 137 and a second discharge opening 135, the first discharge opening 137 is connected to a first connecting passage 122, and an opening 122a is formed in a vicinity of the opposite-side end of the first connecting passage 122. The opening 122a is disposed so as to face the suction part of the wings 118 of the magneto-rotor 115. In this manner, part of the air in the dust separating device 121 is suctioned by the magneto-rotor 115 via the first connecting passage 122. On the other hand, from the second discharge opening 135, part of the air in the dust separating device 121 is suctioned through an air-intake process of the engine 112 and sent to the interior of the air-cleaner-case case 124. In the interior of the air-cleaner-case case 124, a sponge 125a and an air filter 125b which filter air are provided, and the air from the air-cleaner-case case 124 to an air-intake passage 126 is supplied to a carburetor 111 through the sponge 125a and the air filter 125b. Here, an opening portion at an entrance of the path from the dust separating device 121 to the second discharge opening 135, that is, a diameter $R_2$ of the boundary wall part 138 to be described later is sufficiently larger than a diameter $R_1$ of an opening of the carburetor 111, and a cross section of the diameter of the opening portion of the boundary wall part of the boundary wall part 138 from the dust separating device 121 to the air cleaner case 124 is made large to reduce resistance of air intake at the carburetor 111, thereby decreasing pressure loss.

Herein, when viewed in the front-back direction of the engine cutter 101, a perpendicular plane (or perpendicular line) 162 that passes through longitudinal-direction central axis of the cylindrical shape of the dust separating device 121 is in a positional relation that it is positioned between a perpendicular plane (or perpendicular line) 161 that passes through the farthest rear end of the blade cover 102 and the perpendicular plane (or perpendicular line) that passes through the crank shaft (or the center of the piston) of the engine 112. A longitudinal-direction central axis 163 of the cylindrical shape of the dust separating device 121 is extending in the horizontal direction and is in a positional relation that it is parallel to a crank-shaft center 164 of the engine 112 also extending in the horizontal direction. Furthermore, the entirety of the dust separating device 121 is preferable to be disposed so as to be above at least a top position of rotation-range 164 of the magneto-rotor 115 and is preferable to be above a top position of cylinder 165 of the engine 112.

Figure 20:
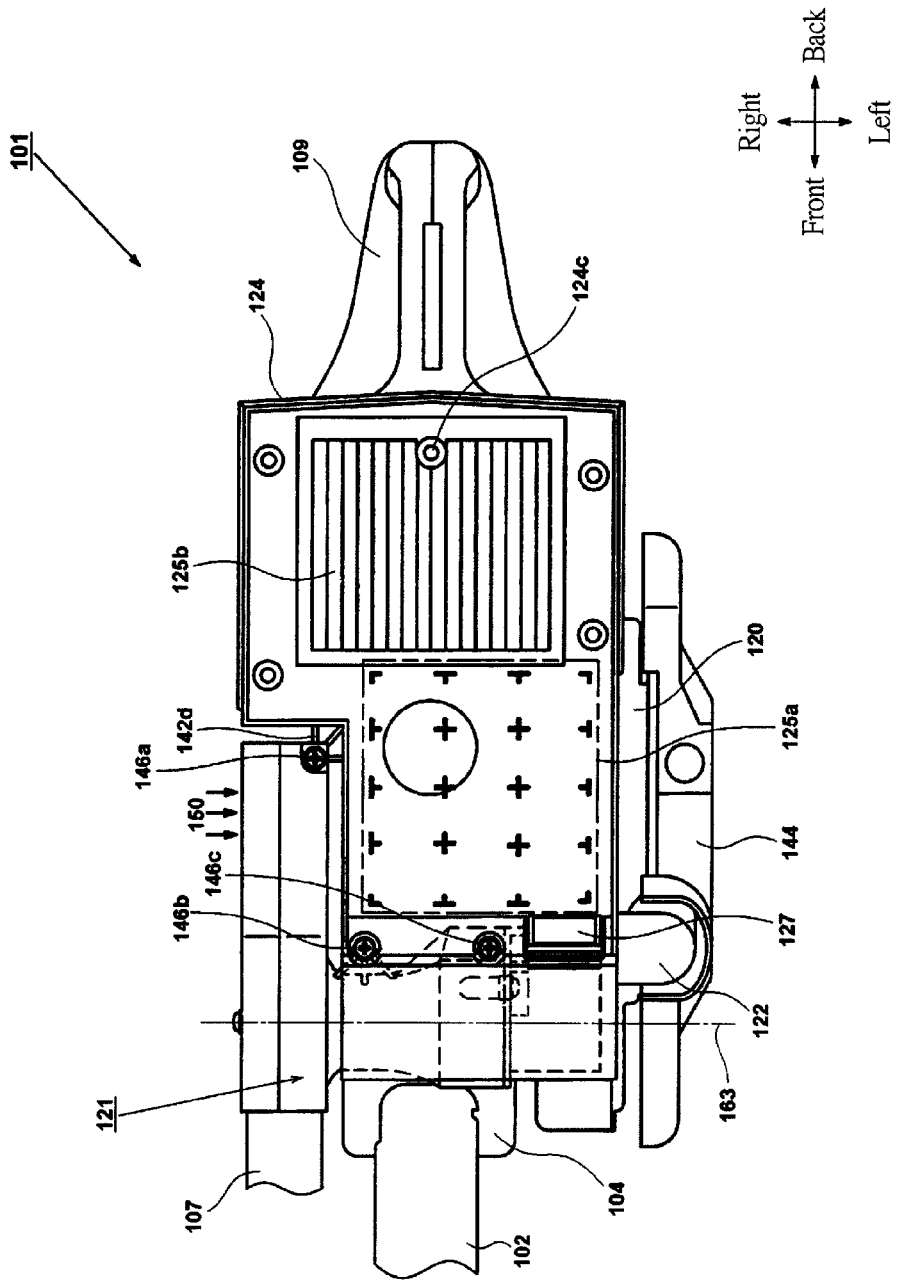
FIG. 20 is a top view of the state in which an air-cleaner-case cover 124a of the engine cutter of FIG. 18 is removed.

FIG. 20 is a top view of the state in which the air-cleaner-case cover 124a of the engine cutter 101 is removed. In the air-cleaner-case case 124, the sponge 125a is provided at the position of a double-dotted dashed line, and the air filter 125b is provided in an obliquely lower side of the sponge 125a. As is understood from the drawing, the sponge 125a and the air filter 125b are disposed so as to be arranged at the positions at which they are substantially not overlapped with each other in the vertical direction. The air-cleaner-case case 124 is disposed in this manner so as to be interposed from the rear side of the engine 112 to the front side through the upper side of the cylinder; therefore, the installation space for the sponge 125a and the air filter 125b can be ensured, the vertical-direction height of the air cleaner case can be suppressed to be low, and thus downsizing of the engine-operated machine can be also achieved. Moreover, workability of replacement or cleaning is very good since the sponge 125a and the air filter 125b can be independently detached. Note that it can be understood that the longitudinal-direction central axis 163 of the cylindrical shape of the dust separating device 121 is disposed so as to be extended to the left/right on the front side of the air-cleaner-case case 124 and is provided so as to be parallel to the crank shaft of the engine 112. The dust separating device 121 is fixed to the air-cleaner-case case 124 with three screws 146a, 146b, and 146c.

In this manner, in the engine cutter 101 of the present Example, purification of air is carried out by the three-stage configuration of the dust separating device 121, the sponge 125a, and the air filter 125b for air purification. As explained in Example 1, most of the dust is separated by the dust separating device 121, and clean air flows into the air-cleaner-case case 124 from the second discharge opening 135. In the air-cleaner-case case 124, further purification is carried out by the two-stage configuration by the sponge 125a and the air filter 125b. Therefore, cleaning only the sponge 125a by the operator is enough in normal maintenance, and the life of the air filter 125b can be considerably extended. Furthermore, the dust separating device 121, which does not require periodic cleaning or replacement parts, is disposed in the uppermost stream (uppermost stage) for taking in the air from the outside air; therefore, the maintenance interval of the air cleaner mechanism can be considerably extended. The dust separating device 121 added to the first stage does not penetrate through the members such as the sponge and the filter; therefore, increase in the inflow resistance can be suppressed to the minimum. Furthermore, the air introducing path from outside-air introduction to the air cleaner case can be formed with the shortest distance, and the volumes of the sponge and the air filter can be maximally ensured while ensuring downsizing of the engine-operated machine. Furthermore, assembly/decomposition performance is improved since the dust separating device 121 and the air-cleaner-case case 124 are disposed above the engine 112.

Figure 21:
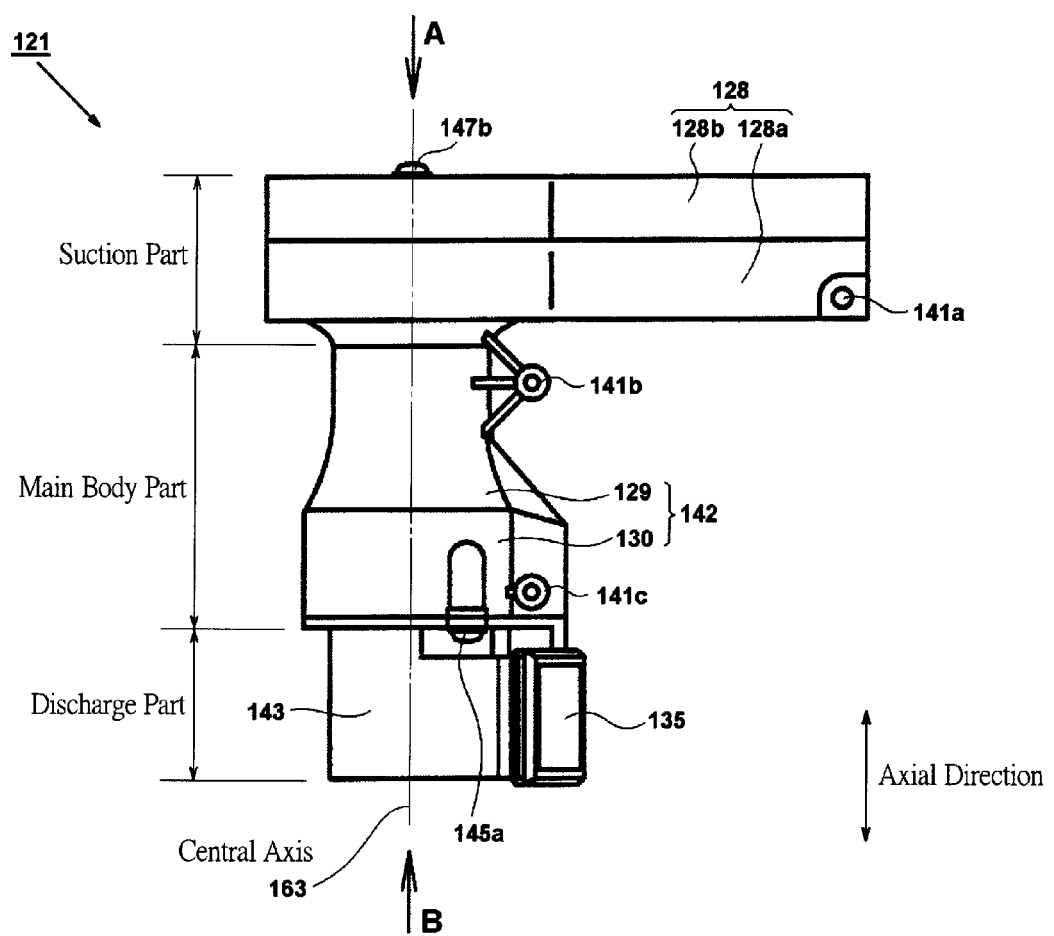
FIG. 21 is a top view of a dust separating device 121 of FIG. 16.

FIG. 21 is a top view of only the dust separating device 121. The dust separating device 121 is mainly composed of: three parts, i.e., a suction part 128 serving as an air intake part; a main body part 142 having a substantially cylindrical shape for separating the suctioned dust by using swirling flows; and a discharge part 143 forming discharge positions at two locations from the swirling flows. The suction part 128 is the part that takes in the outside air and configured to have the shape (described later) that generates the airflows rotated in the circumferential direction of the cylindrical main body part 142 upon intake of the outside air. The main body part 142 causes the swirling flows generated in the suction part 128 to flow in the direction toward the discharge part 143 while causing them to be spread and swirled in the radial direction and separates the dust contained in the outside air outward in the radial direction, in other words, to the lateral wall side of the coupling part 129 by the centrifugal force caused by the swirling flows. The swirling flows in this process are the swirling flows containing a large amount of dust in the radial-direction outside, but are the swirling flows containing a small amount of dust in the radial-direction inside. The outside air containing dust and flown into the separation part 130 while swirling is separated into the outside-wall-side flow containing a large amount of the dust and the inside flow containing a small amount of the dust. The inside flow containing a small amount of the dust in the discharge part 143 flows into the interior space of the air-cleaner-case case 124 (see FIG. 19) via the second discharge part 135.

The dust separating device 121 is fixed to the air-cleaner-case case 124 by the three screws 146a, 146b, and 146c (see FIG. 20); therefore, screw bosses 141a, 141b, and 141c are formed. The screw boss 141a is provided on the suction part 128 and is integrally manufactured with a lateral wall part 128a of the suction part 128. The screw bosses 141b and 141c are provided on the main body part 142 and are integrally manufactured with the main body part 142. The lateral wall part 128a and the main body part 142 are manufactured by integral molding of a polymer resin such as plastic. The present Example is configured so that a cover part 128b and the discharge part 143 are attached to the part of the integral molding of the lateral wall part 128a and the main body part 142.

Figure 22:
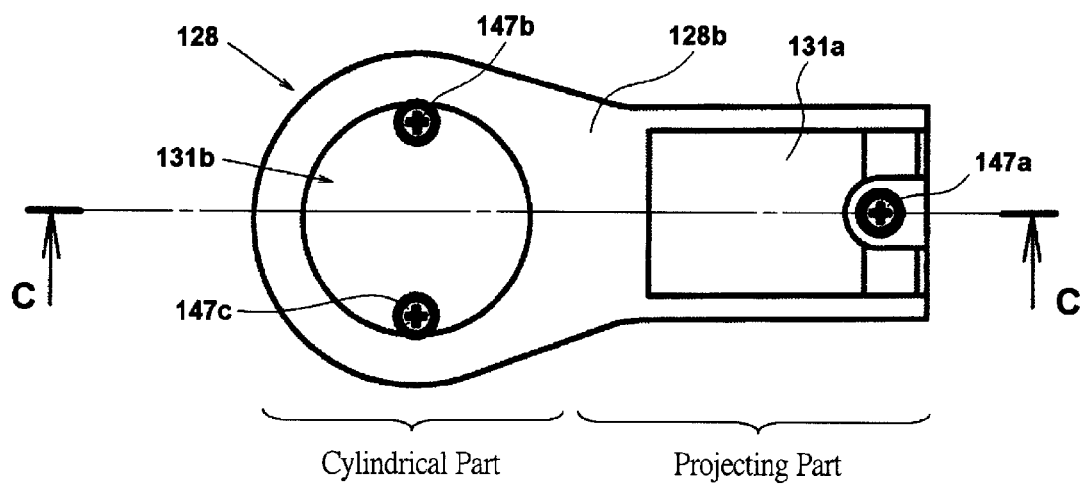
FIG. 22 is a right lateral view of the dust separating device 121 of FIG. 16.

FIG. 22 is a left lateral view of the dust separating device 121 and is a drawing viewed from the direction of the arrow A of FIG. 21. The cover part 128b constituting the suction part 128 plays the role of a cover that covers the lateral wall part 128a and defines predetermined space of the suction part 128. In the cover part 128b, a rectangular opening 131a serving as an inlet of the outside air and a conical recess 131b recessed inward for forming a later-described inner wall part of the air inlet are formed, and the cover part 128b is fixed to the lateral wall part 128a of the suction part 128 by three screws 147a to 147c. Note that, in the present configuration, a substantially-cuboidal projecting part projecting from the cylindrical part of the dust separating device 121 toward the rear is formed, the projecting part being provided so that intake air is uniformly supplied to a plurality of air inlets 132 provided at a substantially equal interval in the circumferential direction. Also, the roles of attachability to the air-cleaner-case case 124, appearance design, and air-intake sound reducing effects are also exerted; however, whether to provide the projecting part or not, the front-back-direction length of the projecting part, etc. are optional, and other shapes and sizes may be employed.

Figure 23:
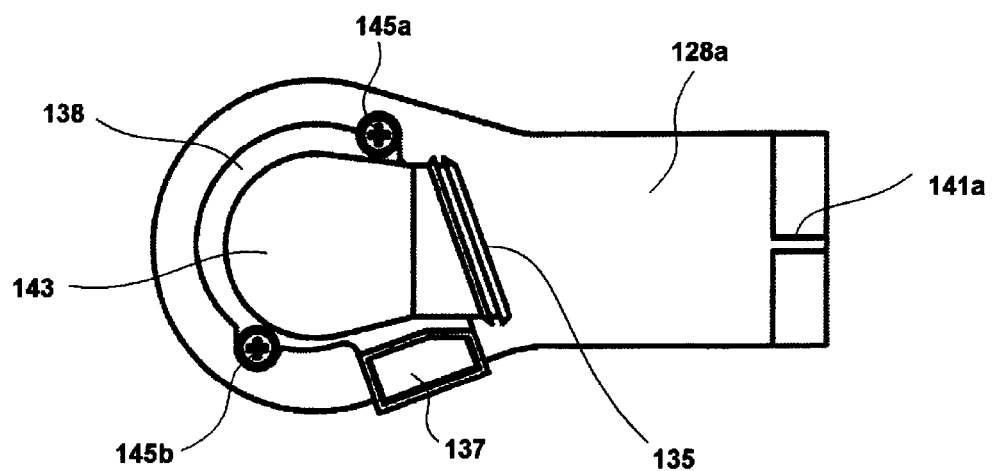
FIG. 23 is a left lateral view of the dust separating device 121 of FIG. 16.

FIG. 23 is a right lateral view of the dust separating device 121 and is a view from the direction of the arrow B of FIG. 21. The discharge part 143 is provided with the second discharge opening 135, which is provided with an outlet in the circumferential direction of the dust separating device 121, and the first discharge opening 137, which is provided with an outlet in the axial direction of the dust separating device 121. The discharge part 143 is manufactured by integral molding of a synthetic resin such as plastic and fixed to the separation part 130 of the main body part 142 by two screws 145a and 145b. In FIG. 23, the separation part 130 and the lateral wall part 128a of the suction part are seen in the back of the discharge part 143.

Figure 24:
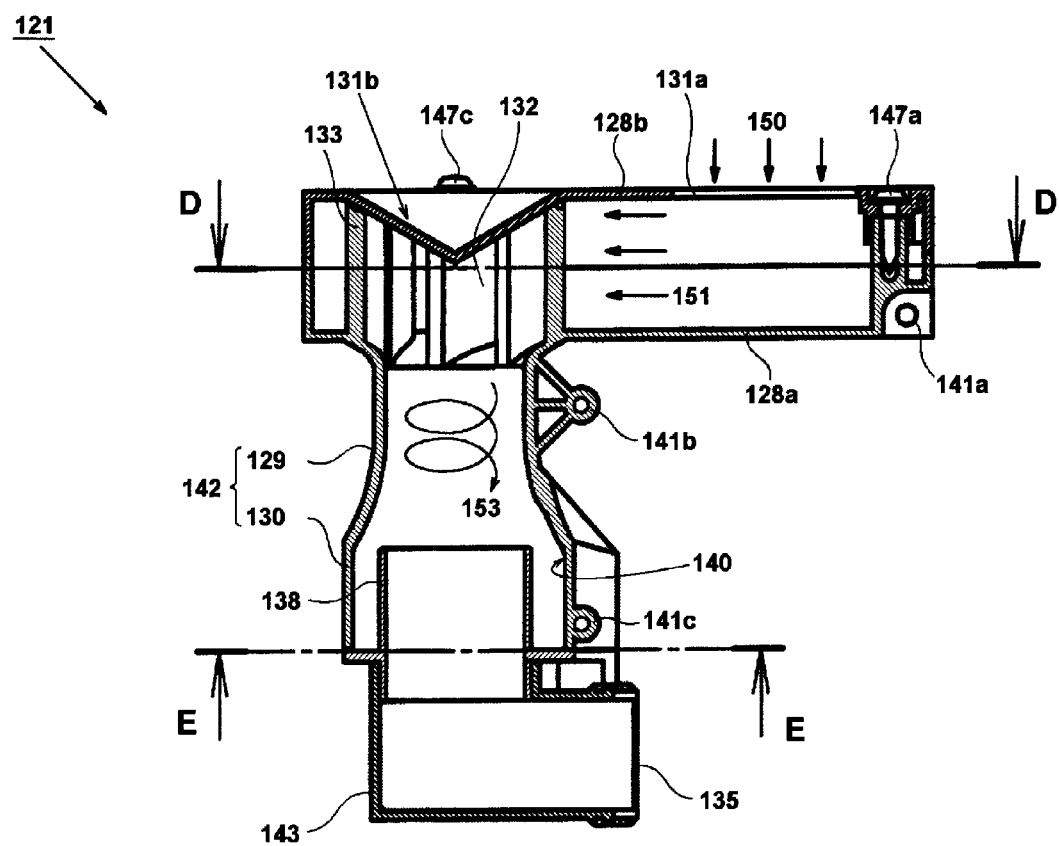
FIG. 24 is a transverse cross-sectional view cut along the dust separating device 121 of FIG. 16 and is a cross-sectional view of the C-C part of FIG. 22.

Next, cross-sectional shapes of the parts of the dust separating device 121 will be explained by using FIGS. 24 to 26. FIG. 24 is a transverse cross-sectional view cut along the dust separating device 121 of FIG. 16 and is a cross-sectional view cut along the C-C part of FIG. 22. The parts of the dust separating device 121 are manufactured by integral molding of a synthetic resin such as plastic, the molding being carried out with the three molding parts. The main body part 142, which is in a vicinity of the center, and the lateral wall part 128a are manufactured by integral molding, and the cover part 128b is fixed to a first lateral end (right lateral end) thereof with the screws 147a to 147c. To the opposite-side end of the dust separating device 121, molded parts of the discharge part 143 and a boundary wall part 138 are fixed by screws. In the flow of air, outside air is taken in from the opening 131a as shown with arrows 150 and flows in the direction of arrows 151 in the projecting part (see FIG. 22) of the suction part 128 as shown by the arrows 151. A cross-sectional shape of a vicinity of the arrows 151 is shown by FIG. 25.

Figure 25:
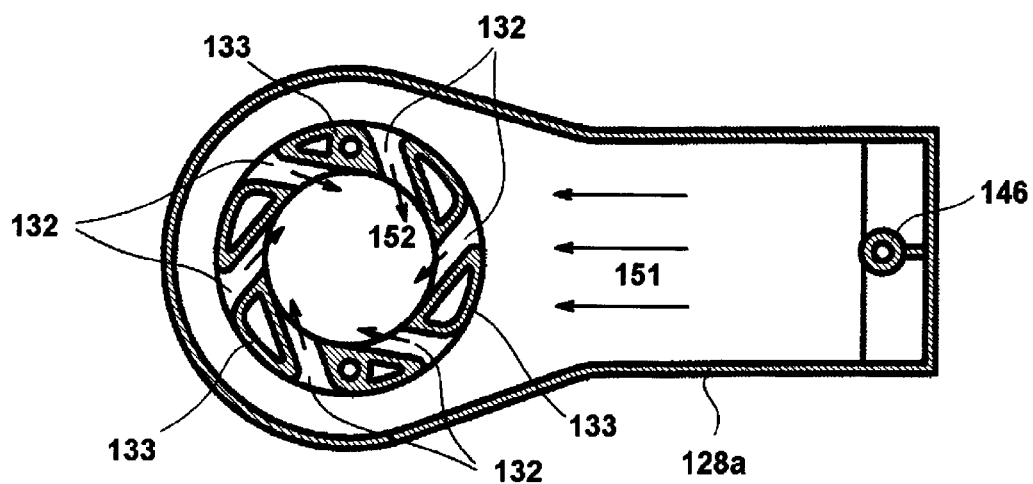
FIG. 25 is a cross-sectional view of the D-D part of FIG. 24.

FIG. 25 is a cross-sectional view of the D-D part of FIG. 24. Each of the airflows flowing like the allows 151 flows toward the center part as shown by arrows 152 so as to be substantially directed toward a tangent-line direction with inclination in a predetermined direction with respect to the radial direction by the plurality of air inlets 132 provided at a substantially equal interval in the circumferential direction. Each of the plurality of air inlets 132 is provided in the lateral wall 133 of the suction part 128 so as to be substantially directed toward the tangent-line direction with inclination in the predetermined direction with respect to the radial direction at the substantially equal interval in the circumferential direction; therefore, the outside air suctioned from the air inlets 132 become swirling flows in the suction part 128 and flow toward the coupling part 129.

Returning again to FIG. 24. The airflows penetrated through the air inlets 132 become the swirling flows rotating in the radial direction and flow like an arrow 153 toward the discharge part 143 in the axial direction by virtue of the inclination of the air inlets 132 in the predetermined direction with respect to the radial direction and the effect of the inner wall of the conical recess 131b of the cover part 128b. The main body part 142 is composed of the coupling part 129, which has the shape of a substantially circular truncated cone having a gradually increased outer diameter, and the separation part 130, which has a constant outer diameter. In the swirling flow like the arrow 153 flowing in the coupling part 129, the dust contained in the outside air is separated to the outside of the radial direction, in other words to the lateral wall side of the coupling part 129 by the centrifugal force caused by the swirling flows since the outer diameter is gradually increased toward the separation part 130. Therefore, the swirling flow becomes the swirling flow that contains a large amount of the dust in the outside of the radial direction and becomes the swirling flow that contains a small amount of the dust in the inside of the radial direction.

The dust-containing outside air which has flown in from the coupling part 129 to the separation part 130 while swirling is separated by the boundary wall part 138 into the flow of the outer lateral wall side that contains a large amount of dust and the inside flow that contains a small amount of the dust. Then, the outside air containing a large amount of the dust and flowing in the outer lateral wall side is caused to flow in the circumferential direction along an inner peripheral wall 140 and flow out to the vicinity of the wings 118 from the first discharge opening 137 via the first connecting passage 122 by the suction power caused by rotation of the magneto-rotor 115. The air suctioned by the wings 118 of the magneto-rotor 115 is sent to a heat-generating part, particularly, to the vicinity of the cooling fin of the cylinder as a cooling wind of the engine 112. On the other hand, in the outside air flown in from the coupling part 129 to the separation part 130 while swirling, the air that contains a small amount of the dust and flows inside is suctioned by the air-cleaner-case case 124 from the second discharge opening 135 via the second connecting passage 127 and sent to the carburetor 111 through the sponge 125a and the air filter 125b.

Figure 26:
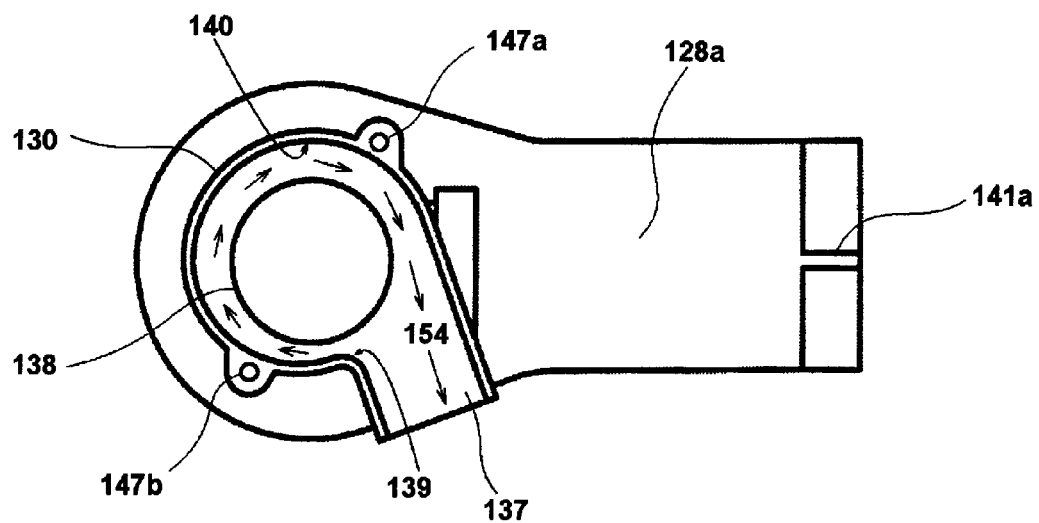
FIG. 26 is a cross-sectional view of the E-E part of FIG. 24.

FIG. 26 is a cross-sectional view of the E-E part of FIG. 24. Herein, the airflows like arrows 154 that flow outside of the boundary wall part 138 flow out from the first discharge opening 137 to the first connecting passage 122 (see FIG. 19). The cylindrical boundary wall part 138 is eccentrically provided so as to be close to a first end 139 of the first discharge opening 137 with respect to the cylindrical outer lateral wall of the separation part 130 in the longitudinal direction view of the dust separating device 121. Thus, a volute shape which has a diameter gradually increased along with the circumferential direction thereof and is smoothly connected to the first discharge opening 137 is formed. The boundary wall part 138 is eccentrically provided so as to be close to the first end 139 also with respect to the inner peripheral wall 140 of the separation part 130.

As described above, according to the engine cutter 101 of Example 2, the strong swirling airflows are formed in the dust separating device 121 by the suction power caused by the magneto-rotor 115 and the air-intake effect of the engine 112, and the dust separating device 121, which separates garbage and dust molecules having a comparatively heavy mass from air and collecting them by the centrifugal force generated by the swirling, is provided in addition to the air cleaner part. Therefore, only the air from which the amount of the dust is considerably reduced is introduced into the air filter 125. Therefore, even under poor conditions in which a massive amount of dust is generated, for example, in an operation of cutting, for example, concrete, clogging in the air filter 125b in an early stage can be considerably suppressed. The power source (suction power) of the dust separating device 121 only utilizes the mechanism owned by a normal engine-operated machine; therefore, a new power source such as a motor is not required to be prepared. Furthermore, since the sponge 125a is provided in addition to the air filter 125b in Example 2, only cleaning the sponge 125a is normally enough, and maintainability can be considerably improved by reducing the frequency of cleaning or replacement of the air filter, which has been frequently carried out.

REFERENCE SIGNS LIST

1 Engine cutter
2 Blade cover
3 Blade
4 Muffler
5 Casing
6 Front handle
7 Fuel tank
8 Trigger
9 Rear handle
10 Frame part
11 Carburetor 12 Engine
13 Crank case
14 Crank shaft
15 Magneto-rotor
16 Ignition coil
17 Spark plug
18 Wing
19 Air-intake hole
20 Rotor cover
21 Dust separating device
22 First connecting passage
23 Starter handle
24 Air cleaner case
25 Air filter
26 Air-intake passage
27 Second connecting passage
28 Suction part
29 Coupling part
30 Separation part
31 Cover part
32 Air inlet
33 Lateral wall (of suction part 28)
34 Bottom surface
35 Second discharge opening
36 Outer lateral wall
37 First discharge opening 38 Boundary wall
39 End (of first side of first discharge opening)
40 Inner peripheral wall (of coupling part 29)
41 Recessed portion
42 Main body part
43 Discharge part
44 Fan cover
45 Intake opening
101 Engine cutter
102 Blade cover
102a Angle adjusting lever
103 Blade
104 Muffler
105 Casing
106 Front handle
107 Arm
108 Trigger
109 Rear handle
110 Frame part
111 Carburetor
112 Engine
115 Magneto-rotor
116 Ignition coil
117 Spark plug
118 Wing
119 Air-intake hole
120 Rotor cover
121 Dust separating device
122 First connecting passage
122a Opening
124 Air-cleaner-case case
124a Air-cleaner-case cover
125 Air filter
125a Sponge
125b Air filter
126 Air-intake passage
127 Second connecting passage
128 Suction part
128a Main body part
128b Cover part
129 Coupling part
130 Separation part
131a Opening
132 Air inlet
135 Second discharge opening
137 First discharge opening
138 Boundary wall part
139 First end
140 Inner peripheral wall
141a, 141b, 141c Screw bosses
142 Main body part
144 Fan cover
145a, 145b Screws
146a, 146b, 146c Screws
147a, 147b, 147c Screws

The invention claimed is:

1. An engine-operated machine comprising:
suction means being driven by an engine to suction air;
an air cleaner case housing an air filter filtrating the air supplied to the engine;
a dust separating device having a substantially tubular shape, the dust separating device having an air inlet provided in a lateral surface on a first end side in a longitudinal direction so as to be inclined in a predetermined direction with respect to a radial direction in a longitudinal-direction view and to penetrate through inside and outside of the lateral surface, a first discharge opening provided in the lateral surface on a second end side in the longitudinal direction, and a second discharge opening provided at the second end so as to be separated from the lateral surface on the second end side;
a first air discharge passage having a first end connected to the suction means and having a second end connected to the first discharge opening; and
a second air discharge passage having a first end connected to the air cleaner case on an upstream side of the air filter and having a second end connected to the second discharge opening,
wherein the dust separating device includes a suction part provided with an air inlet, a separation part provided with a first discharge opening, and a coupling part provided between the suction part and the separation part, and a cross-sectional area of the coupling part in the longitudinal direction gradually increases from the air inlet side toward the first discharge opening side.

2. The engine-operated machine according to claim 1, wherein a plurality of the air inlets are provided.

3. The engine-operated machine according to claim 1, wherein a center of the second discharge opening is positioned in a vicinity of a center of the substantially tubular shape in the longitudinal-direction view.

4. The engine-operated machine according to claim 1, wherein at the dust separating device has a tubular boundary wall separated from the lateral wall so as to surround an outer edge of the second discharge opening at the second end and extending toward a direction of the first end so as to be opposed to the first discharge opening.

5. The engine-operated machine according to claim 1, wherein the suction means is a cooling fan for cooling the engine attached to a crank shaft of the engine.

6. An engine-operated machine comprising:
a cooling fan attached to an output shaft of an engine driving a bit tool and generating cooling air of a cylinder;
an air cleaner case housing an air filter filtrating the air suctioned to the cylinder of the engine; and
a dust separating device in a substantially cylindrical shape having a suction part carrying out suction while rotating the air by an air inlet, a main body part moving garbage or dust molecules mixed in the air to an outer peripheral side by centrifugal force by swirling the introduced air at a high speed in a container, a first discharge part discharging the air in a center part at an end of the main body, and a second discharge part discharging the air in a peripheral part of the main body,
the first discharge part being connected to the suction part of the cooling fan, the second discharge part being connected to the air cleaner case,
the longitudinal direction of a cylinder housing of the dust separating device being disposed to be substantially parallel to a crank shaft of the engine.

7. The engine-operated machine according to claim 6, wherein a cross section of an opening portion to be connected with the second discharge part in the dust separating device is larger than a diameter of an opening portion of a carburetor connected to the air cleaner case.

8. The engine-operated machine according to claim 6, wherein the dust separating device is attached to the engine so that the discharge part is disposed on the same side as the cooling fan when viewed from a center of the engine.

9. The engine-operated machine according to claim 6, wherein the air suctioned via the first discharge opening is filtrated by a sponge and/or a paper filter provided in the air cleaner case and sent to the cylinder.

10. The engine-operated machine according to claim 6, wherein the air having a high dust rate in the dust separating device is suctioned from the second discharge part by work of the cooling fan, and the air having a low dust rate in the dust separating device is sent to the air cleaner case by air-intake work of the engine.

11. The engine-operated machine according to claim 10, wherein
  the engine-operated machine is a cutter having a rotary cutting blade as the bit tool; and
  the longitudinal-direction center line of the dust separating device is disposed so as to be positioned between the perpendicular plane passing through the crank shaft of the engine and a rear end of a wheel guard covering the cutting blade when viewed in a front-back direction of the engine-operated machine.

12. The engine-operated machine according to claim 6, wherein a longitudinal-direction center line of the cylinder housing of the dust separating device is positioned on a front side than a perpendicular plane passing through the crank shaft of the engine.

13. The engine-operated machine according to claim 12, wherein
  the cylinder is disposed so as to be extended substantially in a perpendicular direction, a muffler of the engine is provided on a front lower side of the cylinder, a carburetor of the engine is provided on a rear side of the cylinder;
  the air cleaner case is disposed so as to be extended to an upper side of the cylinder and the carburetor in a top view; and
  the dust separating device is disposed so as to be adjacent on a front side of the air cleaner case.

14. An engine-operated machine comprising:
suction means being driven by an engine to suction air;
an air cleaner case housing an air filter filtrating the air supplied to the engine;
a dust separating device having a substantially tubular shape, the dust separating device having an air inlet provided in a lateral surface on a first end side in a longitudinal direction so as to be inclined in a predetermined direction with respect to a radial direction in a longitudinal-direction view and to penetrate through inside and outside of the lateral surface, a first discharge opening provided in the lateral surface on a second end side in the longitudinal direction, and a second discharge opening provided at the second end so as to be separated from the lateral surface on the second end side:
a first air discharge passage having a first end connected to the suction means and having a second end connected to the first discharge opening; and
a second air discharge passage having a first end connected to the air cleaner case on an upstream side of the air filter and having a second end connected to the second discharge opening,
wherein the air inlet comprises a plurality of air inlets.

\* \* \* \* \*